(12) United States Patent
Ikeda et al.

(10) Patent No.: US 6,599,403 B2
(45) Date of Patent: Jul. 29, 2003

(54) ELECTROCHEMICAL DEVICE USING SOLID POLYMER ELECTROLYTIC FILM

(75) Inventors: Akira Ikeda, Tokyo (JP); Kenro Mitsuda, Tokyo (JO); Hisatoshi Fukumoto, Tokyo (JP); Kuraki Kitazaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/730,600

(22) Filed: Dec. 7, 2000

(65) Prior Publication Data

US 2001/0004049 A1 Jun. 21, 2001

(30) Foreign Application Priority Data

Dec. 21, 1999 (JP) ............................. 11-362246
Dec. 21, 1999 (JP) ............................. 11-362247
Dec. 21, 1999 (JP) ............................. 11-362248

(51) Int. Cl.[7] ................................. C25B 9/00
(52) U.S. Cl. ...................................... 204/263
(58) Field of Search ................. 204/252, 263, 204/265, 266, 241, 239, 236

(56) References Cited

U.S. PATENT DOCUMENTS 4,316,782 A  2/1982  Foller et al. ............... 204/129
4,416,747 A  11/1983  Menth et al. ............... 204/129

FOREIGN PATENT DOCUMENTS

| EP | 0 585 049 | 3/1994 |
| FR | 2 735 991 | 1/1997 |
| JP | 02 071815 | 3/1990 |
| JP | 03 245813 | 11/1991 |
| JP | 05 103941 | 4/1993 |
| JP | 05 325983 | 12/1993 |
| JP | 6-063343 | 3/1994 |
| JP | 9-071889 | * 3/1997 |
| JP | 11-131276 | 5/1999 |

* cited by examiner

Primary Examiner—Nam Nguyen
Assistant Examiner—Thomas H. Parsons
(74) Attorney, Agent, or Firm—Oblon, Spivak, McClelland, Maier & Neustadt, P.C.

(57) ABSTRACT

The object of the present invention is to provide a thin and light electrochemical device using a solid polymer electrolytic film, which is capable of maintaining its steady performance for a long time even at a high humidity condition and a process for preparing the same. The device comprises inserting and pressuring the jointed electrochemical device 10 between a pair of pressing plates 30 and 31, wherein the jointed electrochemical device 10 is obtained by jointing the anode and the cathode having a catalytic layer on a base substrate of conductive porous material to both sides of the solid polymer electrolytic film, and wherein the pressing plates have the opening part having an area smaller than an electrochemical reaction part formed by facing the anode and the cathode.

16 Claims, 32 Drawing Sheets

ELECTROCHEMICAL DEVICE USING SOLID POLYMER ELECTROLYTIC FILM

BACKGROUND OF THE INVENTION

1. Field of the Invention

The present invention relates to an electrochemical device using solid polymer electrolytic film based on an electrochemical reaction. In particular, the present invention relates to an electrochemical device which generates gases such as an ozone gas, an oxygen gas and a hydrogen gas by an electrochemical reaction in the process of inducing direct current voltage by facing an anode with a cathode having a solid polymer electrolytic film therebetween. The present invention also relates to an electrochemical device such as a dehumidifying device which dehumidifies moisture in air, or a gas detection sensor which detects a leaked gas.

2. Description of the Related Art

Prior Art Embodiment 1

FIG. 42 shows a constructional view of a dehumidifying device which is an example of the conventional electrochemical device using a solid electrolytic film disclosed, for example, in Japanese Unexamined Patent Publication No. 216714/1986. In the figure, numeral 101 indicates an anode, numeral 102 a cathode, numeral 103 a solid polymer electrolytic film, numeral 105 a collector, numeral 106 and 107 a terminal plate, numeral 108 a case, numeral 109 a pump, numeral 110 a cathode room, numeral 111 an anode room, numeral 112 a water pool, numeral 113 an exhaust port for remaining gas and numeral 114 an oxygen exhaust port.

Anode 101 and cathode 102 are jointed to each surface of a solid polymer electrolytic film 103 comprising perfluorocarbon sulfonate resin as a whole. The anode 101 comprises platinum and is jointed to solid polymer electrolytic film 103 by non-electrolytic plating. The cathode 102 is constituted by jointing a composition comprising carbon powder having platinum catalyst, poly(tetra-fluoroethylene), perfluorocarbon sulfonic acid resin and the like to solid polymer electrolytic film 103 by a hot press method. Wave-shaped collectors 104 and 105 are placed behind anode 101 and cathode 102, respectively. Further, titanium terminal plates 106 and 107 are placed behind the collectors 104 and 105, respectively. These elements are fixed by a case 108. Additionally, air for dehumidification is introduced by a pump 109 into cathode room 110 and anode room 111 which are formed in each space around anode collector 104 and cathode collector 105, respectively.

Water vapor in the introduced air is absorbed by solid polymer electrolytic film 103. If a direct current voltage of 1.4 V is induced between the cathode terminal plate 106 and the anode terminal plate 107 in this condition, electrolytic reductive reaction of oxygen is observed at the cathode 102, while oxygen is generated at the anode 101, leading to leakage of water from the back of the cathode 102. The leaked water is pooled in water pool 112 and the remaining gas deoxidated at the cathode 102 is released into air through the remaining gas exhaust port 113 set on the water pool 112. Also, oxygen generated from the anode 101 is released into air through oxygen exhaust port 114 together with redundant air. In this manner, water vapor in air is condensed and is collected in the water pool 112 in liquid condition.

However, a dehumidifying device according to Prior art Embodiment 1 had a problem in that the electrochemical device became heavy and thick since solid polymer electrolytic film 103 is contacted to the anode 101 and the cathode 102 with surface pressure by inserting the solid polymer electrolytic film 103 jointed with the anode 101 and the cathode 102 sandwiched by the collectors 104 and 105 and the terminal plates 106 and 107 into the case 108.

Prior Art Embodiment 2

In order to solve the above problems, there is provided a dehumidifying device which is an example of the conventional electrochemical device using a solid electrolytic film as disclosed for example in Japanese Unexamined Patent Publication Nos. 325983/1993 and 63343/1994, in which a solid polymer electrolytic film with an anode and a cathode is closely contacted to each other without the collectors 104 and 105, the terminal plates 106 and 107 or the case 108. Also, an ozone generating device is proposed which is an example of the conventional electrochemical device using a solid electrolytic film as disclosed in Japanese Unexamined Patent Publication No. 131276/1999.

In these electrochemical devices, on either side of a solid polymer electrolytic film, there are placed an anode having an anode catalytic layer on an anode base substrate comprising conductive porous material and a cathode having an cathode catalytic layer on cathode base substrate comprising conductive porous material. Thermocompression bonding (hot press) is carried out at a temperature of at least 130° C. to less than 210° C. so as to insert the anode and cathode base substrate into a solid polymer electrolytic film. A catalytic layer is formed in the inserted part to achieve close contact.

For example, FIG. 43 shows a construction view of an ozone generator disclosed in Japanese Unexamined Patent Publication No. 131276/1999, being an example of the conventional electrochemical device using a solid electrolytic film. An electrochemical device is formed by hot press at 160° C. placing, on both surfaces of a solid electrolytic film, an anode 1 having an anode catalytic layer on an anode base substrate comprising conductive porous material and a cathode 2 having an cathode catalytic layer on a cathode base substrate comprising conductive porous material.

When about 3 V of direct current voltage by using current power 6 is induced to the electrochemical device formed in unity, water in air is electrolyzed at the jointed surface of the anode 1 and solid polymer electrolytic film 3 to generate an ozone gas, an oxygen gas and electrons. The generated ozone gas and oxygen gas are released outside through the anode 1 which is a porous material. On the other hand, the hydrogen ions generated by electrolysis of water move to the cathode 2 through the solid polymer electrolytic film 3 and water is generated at the jointed surface of the cathode 2 and the solid polymer electrolytic film 3 by reacting the hydrogen ions, oxygen gas in air and electrons led to the cathode 2 from the outside circuit.

The electrochemical device of the Prior art Embodiment 2 using a solid electrolytic film has an advantage of omitting the collectors 104 and 105, the terminal plates 106 and 107 and the case 108, leading to a light and thin solid electrolytic film since the anode 1, the cathode 2 and the solid electrolytic film 3 are unified as a whole by using hot press.

However, there was a problem in that performance of the electrochemical device of Prior art Embodiment 2 decreases in a short period of time if it is used at a high humidity condition wherein relative humidity is more than 70%.

SUMMARY OF THE INVENTION

The present invention has been conducted to solve the problems with the above conventional devices, and the object of the present invention is to provide an electrochemical device comprising a thin and light solid polymer electrolytic film whose properties can be maintained steadily for a long time even at a high humidity condition and a process for preparing the same.

The first electrochemical device of the present invention is obtained by inserting and pressuring a jointed electrochemical device between a pair of pressing plates, wherein the jointed electrochemical device is obtained by jointing an anode and a cathode having a catalytic layer on a base substrate of conductive porous material to both sides of the solid polymer electrolytic film, and wherein the pressing plate has an opening part having an area smaller than an electrochemical reaction part formed by facing the anode and the cathode.

The second electrochemical device of the present invention is a device in which an area of the opening part is 5 to 90% to an area of the electrochemical reaction part in the first device.

The third electrochemical device of the present invention is a device in which the opening part is a plurality of through holes formed on the pressing plate in the first device.

The forth electrochemical device of the present invention is a device in which the pressing plate comprises a metal plate and an insulating resin sheet present between the metal plate and an anode or a cathode, or an insulating resin film covering the metal plate in the first device.

The fifth electrochemical device of the present invention is a device in which the pressing plate comprises an insulating resin plate or an insulating ceramics plate in the first device.

The sixth electrochemical device of the present invention is a device in which the pressing plate is jointed with the device by an insulating adhesive agent except for at least the above opening part in the first device.

The seventh electrochemical device of the present invention is a device in which the opening part is a plurality of through holes formed on the pressing plate in the sixth device.

The eighth electrochemical device of the present invention is a device in which the pressing plate comprises a metal plate and an insulating resin film covering the metal plate in the sixth device.

The ninth electrochemical device of the present invention is a device in which the pressing plate comprises an insulating resin film or an insulating ceramics plate in the sixth device.

The tenth electrochemical device of the present invention is a device in which at least one of the pressing plates has a concave part to which the above jointed electrochemical device is inserted in the first device.

The eleventh electrochemical device of the present invention is a device in which the opening part is a plurality of through holes on a pressing plate in the tenth device.

The twelfth electrochemical device of the present invention is a device in which the pressing plate comprises a metal plate and an insulating resin film covering the metal plate in the tenth device.

The thirteenth electrochemical device of the present invention is a device in which the pressing plate comprises an insulating resin film or an insulating ceramics plate in the tenth device.

The fourteenth electrochemical device of the present invention is a device in which the pressing plate is jointed with the device by an insulating adhesive agent except for at least the above opening part in the tenth device.

The fifteenth electrochemical device of the present invention is a device which has an opening part to which the jointed electrochemical device is inserted, and wherein spacers thinner than the jointed electrochemical device are placed between a pair of pressing plates in the first device.

The sixteenth electrochemical device of the present invention is a device in which the pressing plate comprises an insulating resin plate or an insulating ceramics plate in the fifteenth device.

The seventeenth electrochemical device of the present invention is a device in which the pressing plate is jointed by an insulating adhesive agent except for at least the opening part in the fifteenth device.

The air conditioner of the present invention is an air conditioner comprising the electrochemical device of the first electrochemical device.

The refrigerator of the present invention is an air conditioner comprising the electrochemical device of the first electrochemical device.

The process for preparing the first electrochemical device of the present invention is a process for preparing an electrochemical device comprising a jointed electrochemical device, which is obtained by jointing an anode and a cathode having a catalytic layer on a base substrate of conductive porous material to both sides of a solid polymer electrolytic film, and a pair of pressing plates, which is placed to insert the electrochemical device between the anode and cathode side and has an opening part corresponding to an electrochemical reaction part formed by facing the anode and cathode, wherein the pressing plate is placed on the anode and cathode side of the jointed electrochemical device by using a sheet of insulating adhesive agent therebetween and hot-pressed to joint the pressing plate.

DETAILED DESCRIPTION

Reasons and countermeasures for lowering properties of an electrochemical device using a solid polymer electrolytic film in Prior art Embodiment 2 as in Japanese Unexamined Patent Publication Nos. 325983/1993, 63343/1994 and 131276/1999 have been intensively studied. As a result, the following is found:

(1) A solid polymer electrolytic film absorbs water and is expanded remarkably and exponentially at a high humidity of at least 70%.

(2) Due to the stress of ozone gas or oxygen gas generated by an electrochemical reaction, a jointed surface of an anode or a cathode and a solid polymer electrolytic film is peeled off and properties of the electrochemical device are lowered, especially at a high humidity condition.

(3) Conventionally, it is thought that properties will be remarkably lowered when an electrochemical device is pressed from both sides by using pressing plates because a part of an electrode which is pressed by the pressing plates receives no gas supply and cannot participate in an electrochemical reaction. However, properties of an electrochemical device will not be lowered even if the device is pressed by using a pair of pressing plates having an opening part area of about 10% of electrochemical reaction area of an electrochemical device.

Embodiment 1

Figure 1:
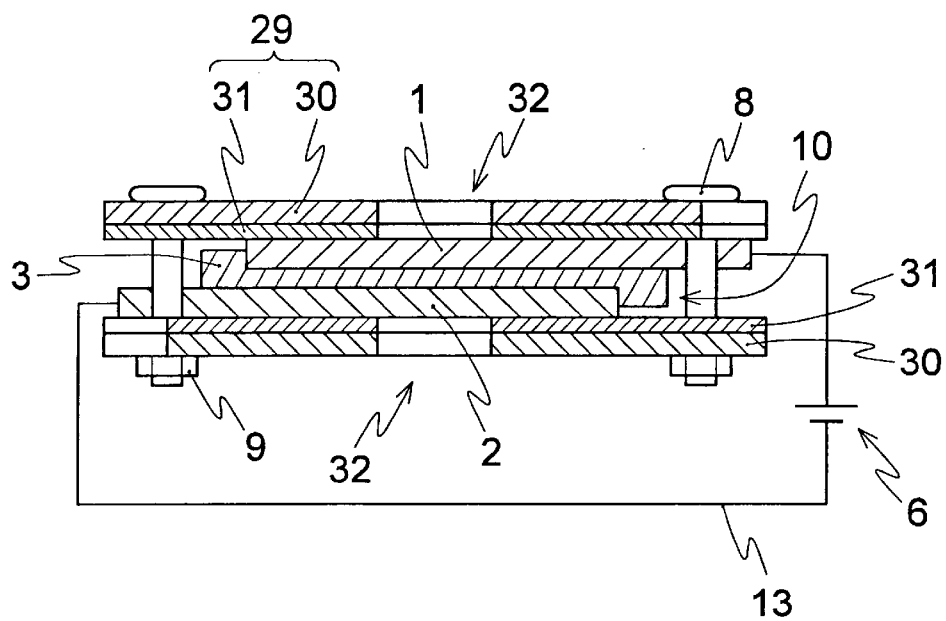
FIG. 1 is a cross sectional view showing a construction of the ozone generator of Embodiment 1.
Figure 2:
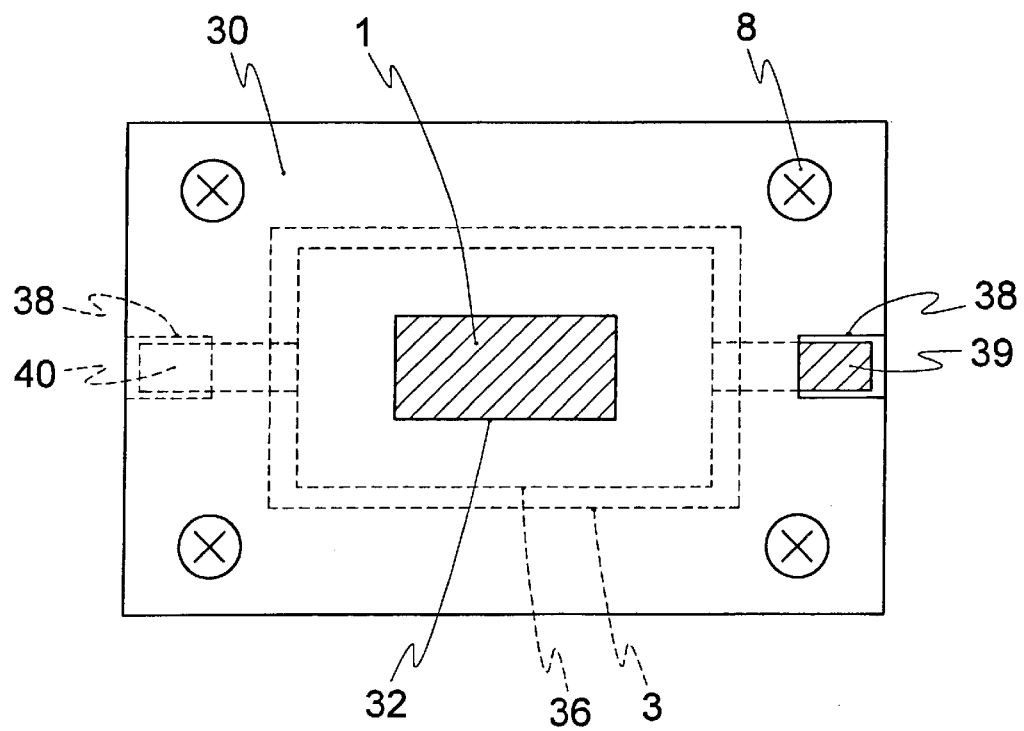
FIG. 2 is a plane view showing a construction of the ozone generator of Embodiment 1.
Figure 3:
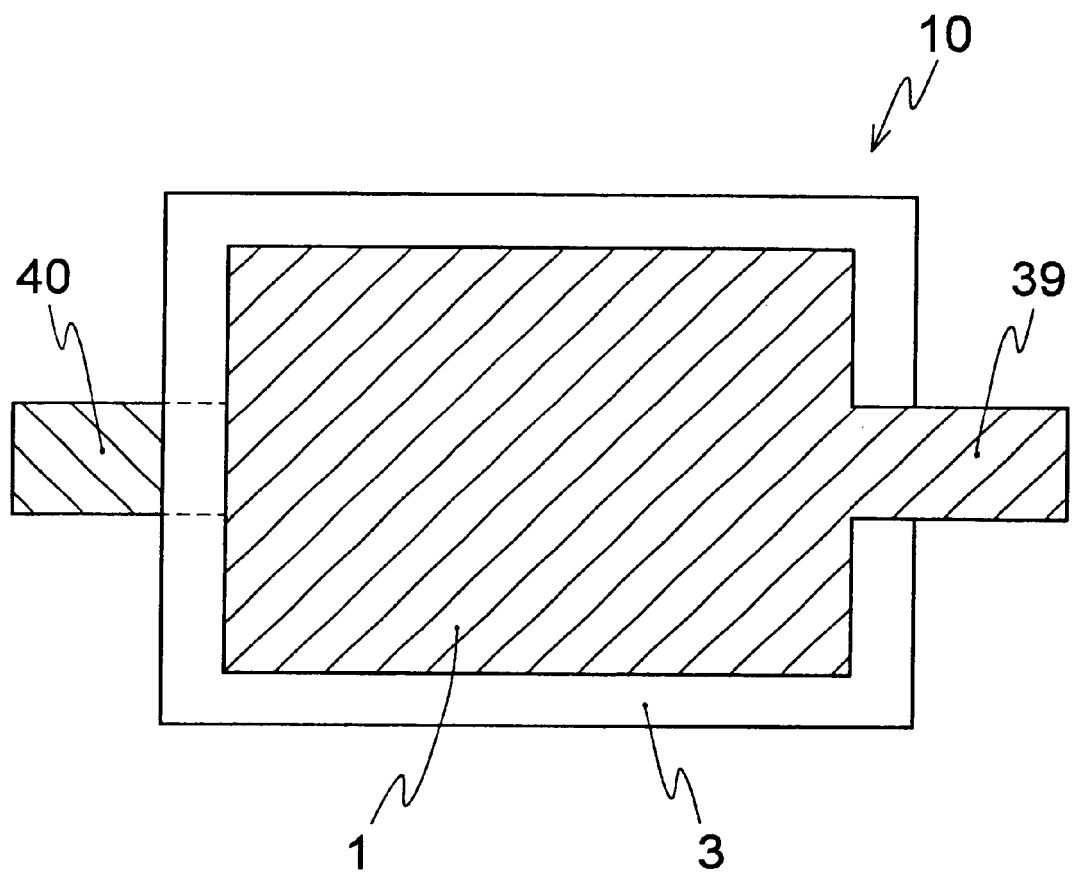
FIG. 3 is a plane view showing a construction of the jointed electrochemical device of the ozone generator of Embodiments 1, 6 and 12.

An electrochemical device according to Embodiment 1 of the present invention is explained below with an ozone generator as an example. FIGS. 1 and 2 are a cross sectional view and a plane view showing a construction of the ozone generator according to the Embodiment 1 of the present invention, respectively. FIG. 3 is a plane view showing an essential part of the FIG. 2.

In the figures, numeral 1 is an anode having an anode catalytic layer on an anode base substrate comprising conductive porous material, numeral 2 a cathode having a cathode catalytic layer on a cathode base substrate comprising conductive porous material, numeral 3 a solid polymer electrolytic film, numeral 6 a direct current power source, numeral 8 a bolt, numeral 9 a nut, numeral 10 a jointed electrochemical device formed by hot-pressing anode 1 and cathode 2 on each surface of a solid polymer electrolytic film, and numeral 13 a cable connecting the direct current power source 6, the anode 1 and cathode 2. Numeral 30 is an ozone-resistant metal plate such as stainless plate having an opening part 32, numeral 31 an insulating resin sheet which insulates the metal plate 30 from anode 1 and cathode 2 having an opening part 32 of the same shape as that of the metal plate 30, and the metal plate 30 and the insulating resin sheet 31 constitute pressing plate 29. Numeral 36 is an electrochemical reaction part formed by facing the anode 1 and the cathode 2 which generates an ozone gas or an oxygen gas by an electrochemical reaction, numeral 38 is a cut part placed on the metal plate 30 and insulating resin sheet 31 for terminal connection, numeral 39 is an anode terminal connected to the anode 1 and numeral 40 is a cathode terminal connected to the cathode 2.

The jointed electrochemical device 10 obtained by hot press may be formed in the same manner as a process of preparing a conventional ozone generator using a solid polymer electrolytic film, which is disclosed, for example, in Japanese Unexamined Patent Publication No. 131276/1999. Materials and preparation process are explained in detail below, but the present invention is not limited thereto.

An ion exchange film of perfluorocarbon sulfonate was employed for the solid polymer electrolytic film 3.

As a base substrate of the anode 1, thin titanium plate was cut and expanded to obtain a porous expanded metal having a thickness of hundred $\mu$m to which platinum planting base was added. β or α lead dioxide was coated to the anode base substrate by electrodeposition to form an anode catalytic layer having a thickness of a few $\mu$m to a few ten $\mu$m.

When an electrochemical device is used for generating oxygen or dehumidification, as the anode 1, there is used a base substrate which is obtained by making a break in and expanding a thin titanium plate as a base substrate and then by planting platinum as a catalytic layer to the obtained porous expanded metal.

On the other hand, as a base substrate used for the cathode 2, there is used a material which is obtained by a water-proofing treatment comprising applying polytetrafluoroethylene particulate (hereinafter referred to as PTFE) to a porous carbon cross made of carbon fiber having a thickness of a few hundred $\mu$m and thermal treating at 350° C. for an hour. Cathode catalytic layers were formed on each side of the cathode base substrate in this embodiment. The catalytic layer at the side of the solid polymer electrolytic film 3 is porous and has a thickness of a few ten $\mu$m which is prepared by applying liquefied solid polymer electrolyte as a binder to a catalyst of carbon powder with platinum particulate. The catalytic layer at the other side is porous and has a thickness of a few ten $\mu$m prepared by applying PTFE particulate as a binder to a catalyst of carbon powder with platinum particulate. Each catalytic layer on the anode was screen-printed to both sides of the water-proofing treated anode base substrate, and thermally treated at about 150° C. for an hour to fuse the solid polymer electrolyte or PTFE added as a binder and connected to the both sides of the cathode base substrate.

Next, the jointed electrochemical device 10 was formed by hot pressing in a condition that the solid polymer electrolytic film 3 was placed between the anode 1 and the cathode 2 having the anode terminal 39 and the cathode terminal 40 on the rectangular electrochemical reaction part 36, respectively, at a higher temperature, for example, 160 to 210° C., than a softening temperature of the solid polymer electrolytic film 3 with a pressure of 50 to 70 kgf/cm$^2$ for at least a few minute. In this case, as FIGS. 2 and 3 indicated, the solid polymer electrolytic film 3 was processed to have a larger area than that of the electrochemical reaction part 36 formed by facing the anode 1 and the cathode 2, which prevented electrical short circuit of the anode 1 and the cathode 2. Also, the anode terminal 39 and cathode terminal 40 were placed oppositely crossing the electrochemical reaction part 36.

If a direct current voltage of about 3 V is induced by the direct current power source 6 between the anode terminal 39 and cathode terminal 40 of the jointed electrochemical device 10, water is electrolyzed at the jointed surface of the anode 1 catalytic layer and the solid polymer electrolytic film 3 to generate an ozone gas, an oxygen gas and electrons. The generated ozone gas and oxygen gas are released outside though the porous anode 1. On the other hand, the hydrogen ions move to the cathode 2 through the solid polymer electrolytic film 3 and water is generated at the jointed surface of the cathode 2 catalytic layer and the solid polymer electrolytic film 3 by reacting the hydrogen ions, an oxygen gas in air and electrons led from the outside circuit. In this case, a few % of current passing to the jointed electrochemical device 10 is used for generating an ozone gas while the rest thereof is used for generating oxygen gas.

Figure 4:
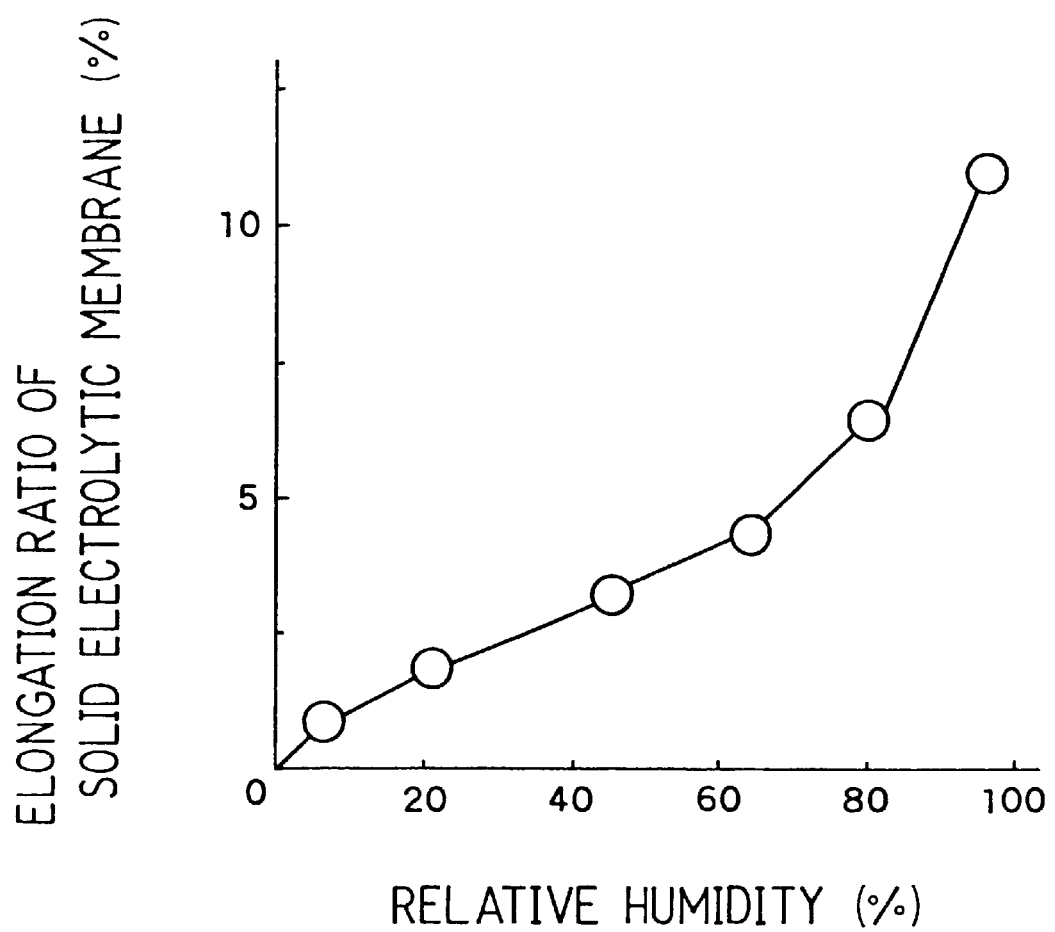
FIG. 4 is a graph showing the relationship between an elongation ratio and relative humidity in Embodiment 1.

Referring to FIG. 4, there are shown results of measurement of elongation ratio of a solid polymer electrolytic film at a direction crossing to lamination direction by changing relative humidity at 25° C. The solid polymer electrolytic film 3 elongates remarkably and exponentially at a direction crossing to lamination direction in a condition of, for example, 25° C., at a relative humidity of at least 70%. The catalytic layer of the anode 1 jointed with the solid polymer electrolytic film 3 peels off by stress generated from the above elongation strength of the solid polymer electrolytic film 3.

If a direct current voltage is induced to the jointed electrochemical device 10, an ozone gas and an oxygen gas are generated at the jointed surface of the anode 1 catalytic layer and the solid polymer electrolytic film 3. The catalytic layer of the anode 1 jointed with the solid polymer electrolytic film 3 peels off by the stress generated from the above process. Particularly, a larger stress is effected at a high humidity condition because of promotion of the above process. Due to such stress, most of the catalytic layer of the anode 1 peels off from the solid polymer electrolytic film 3 during repeated uses, leading to increase in electrical resistance, decrease in current, and finally decrease in ozone generation amount.

Remarkable peeling is also seen at the jointed surface of the cathode 2 catalytic layer and the solid polymer electrolytic film 3 at a high humidity condition due to the elongation strength of the solid polymer electrolytic film 3.

Therefore, for a long use at a high humidity condition, it seems effective to press the anode and cathode surfaces of the jointed electrochemical device 10 with a pressure capable of overcoming such a stress. Conventionally, however, it is thought performance is reduced in proportion to the area of the pressed part, since a part of the electrochemical reaction part 36 is covered with the pressed part and no water is supplied to the part covered by the pressing plates and the generated gas is hardly released into air when the pressing plates are positioned at the anode and cathode side of the jointed electrochemical device 10.

However, according to results of measurement of ozone generation amount and current density by changing a ratio of the area of the opening part 32 to that of the electrochemical reaction part 36 formed by facing anode 1 and cathode 2, ozone generation amount (white circle) and current density (black circle) hardly change, when area ratio of the opening part 32 to that of the electrochemical reaction part 36 ranges from 10 to 100%. There was found a novel phenomenon that ozone generation performance would not be lowered even if the area of the opening part 32 is lowered to as small as one-tenth of that of the electrochemical reaction part 36.

Figure 5:
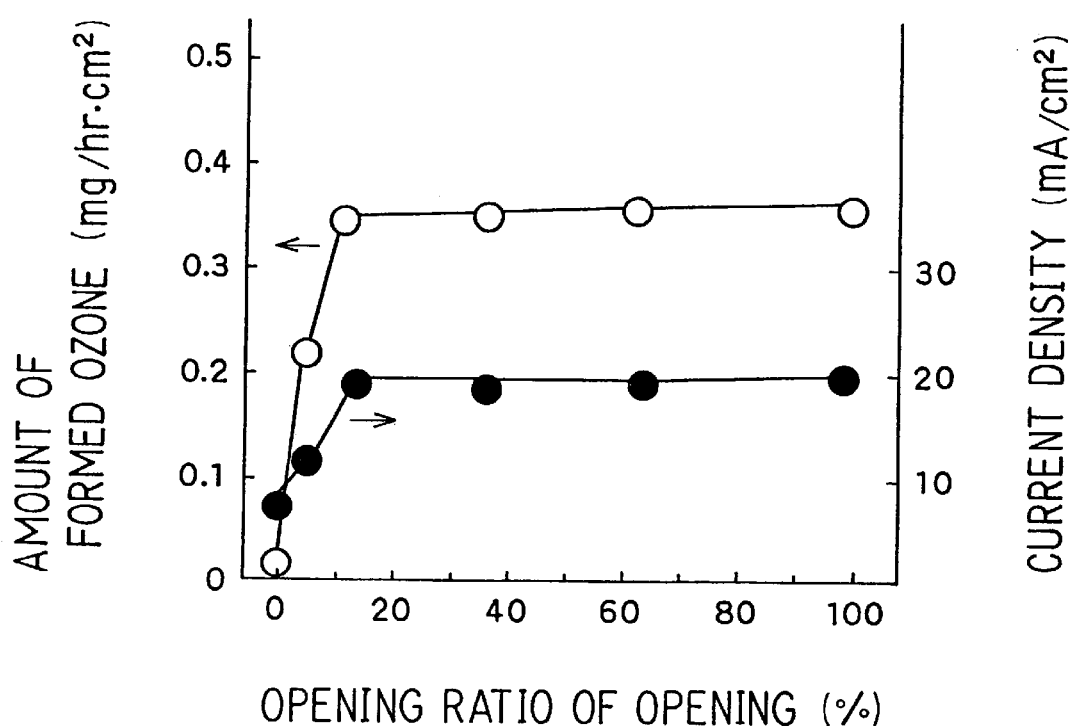
FIG. 5 is a graph showing the relationship between an open ratio and an ozone generation amount in Embodiment 1.

Also, referring to FIG. 5, an opening ratio means a ratio of the area of the opening part 36 to that of the electrochemical reaction part 36 and the same is true in the following. Further, results similar to the ozone gas generation results were obtained in case of oxygen gas generation as well.

The present invention was made according to the above new test results. In this embodiment, for example, the jointed electrochemical device 10 formed by hot press was inserted between a pair of stainless plates 30 comprising a rectangular opening part 32 having an opening ratio of 40% and a cut part 38 for terminal connection, positioning an epoxy resin insulating resin sheet 31 having the same-shaped opening part 32 and cut part 38 for terminal connection therebetween, and the stainless plates 30 were fixed by using the bolt 8 and the nut 9.

After that, the anode terminal 39, the cathode terminal 40 and the current voltage 6 appeared from the cut part 38 on the metal plate 30 and the insulating resin sheet 31 were electrically connected with the cable 13 and 3 V of direct current voltage was induced to the jointed electrochemical device 10.

The size of the metal plate 30 is 40 mm×50 mm with a thickness of 1 mm, while the epoxy resin insulating resin sheet 31 has a thickness of 100 μm and is a size larger than the metal plate 30.

Fixation by using the bolt 8 and the nut 9 was conducted at the four peripheries of the metal plate 30. At this time, a torque driver was used and a fixation pressure was 12.5 kgf per bolt, amounting to 50 kgf in all four.

Figure 6:
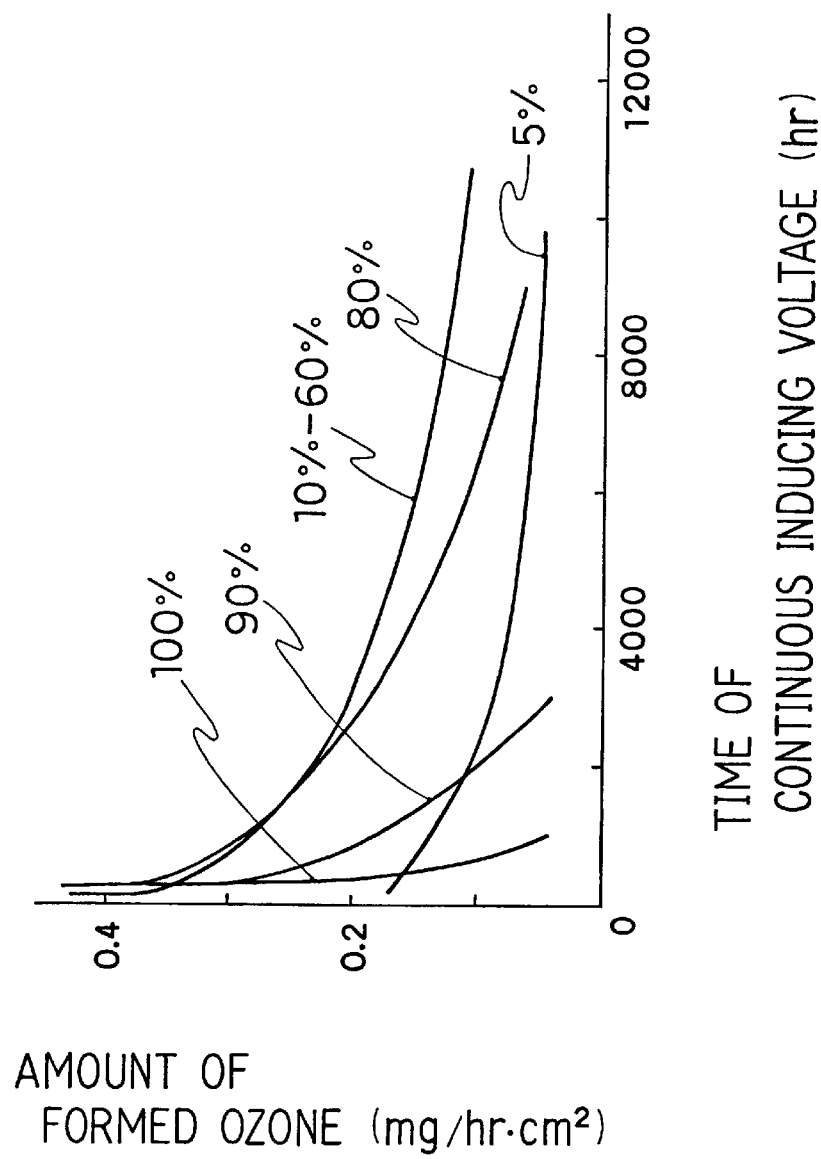
FIG. 6 is a graph showing a change in ozone generation amount at each opening ratio along time in Embodiment 1.

In order to prove the effect of this embodiment, there was investigated changes of ozone generation amount along time in case of inducing 3 V of direct current to the jointed electrochemical device 10 and running it continuously for a long period of time in the condition of a temperature of 25° C. to 30° C. and a relative humidity of 90% for each of the following opening ratios: 5%, 10%, 20%, 30%, 40%, 50%, 60%, 70%, 80%, 90% and 100% (no pressing plate). The results are shown in FIG. 6. In a conventional case of no pressing plate, i.e. an opening ratio of 100%, the ozone generation amount remarkably decreased in a short period of about three weeks (24 hr.×21=504 hr.). On the contrary, in case of this embodiment, i.e. an opening ratio of 10 to 60%, the ozone generation was maintained in a practical amount for at least one year (24 hr.×365=8760 hr.). Furthermore, better results were obtained in case of an opening ratio of 80 or 90% than that of 100%, though the ozone generation is not as much as that in case that an opening ratio is 10 to 60%.

Additionally, if an opening ratio of the opening part 32 was smaller than 5%, performance was maintained for a long time. But gas generation amount became extremely little because the gas and heat generated from the electrochemical reaction of the jointed electrochemical device 10 cannot be efficiently released to outside air. On the other hand, if an opening ratio of the opening part 32 was more than 90%, the gas and heat generated from the electrochemical reaction of the jointed electrochemical device 10 can be effeciently released to the outside air. However, performance is reduced briefly due to insufficient prevention of peeling of the anode 1 catalytic layer and cathode 2 catalytic layer from the jointed surface with the solid polymer electrolytic film 3.

From the above results, an area of the opening part of the pressing plate is preferably 5 to 90% (i.e. an opening ratio of 5 to 90%), more preferably 10 to 80% to the area of the electrochemical reaction part 36.

Further, results similar to the above ozone gas generation results were obtained in the case of oxygen gas generation as well.

In this invention, there was shown an example used in a severe, high humidity condition where peeling is promoted. As a natural consequence, however, there is observed a longer duration than that of a conventional case of the opening ratio being 100% even in a low humidity condition where peeling is low.

A thickness of the metal plate 30 was 1 mm in this embodiment, but a similar effect was also seen when a thickness of the metal plate 30 was 0.5 mm to 2 mm.

A similar effect was also seen when a thickness of the insulating resin sheet 31 was a few ten μm to a few hundred μm.

The insulating resin sheet 31 was positioned between both of the anode 1 and the cathode 2 and the metal plate 30 in this case, but the sheet may be positioned between the metal plate 30 and at lease one of the two electrodes.

A similar effect was also seen when an insulating resin sheet such as an acrylic resin, a fluorine resin, a silicone resin, a sulfone resin, an imide resin, vinyl chloride, PTFE or polyethylene terephthalate, having a thickness of a few ten μm to a few hundred μm instead of using the epoxy resin insulating resin sheet 31.

Fixation using the bolt 8 and the nut 9 was conducted at the four peripheries in this embodiment. Preferably, the number of fixation point should be increased in order to add pressure equally.

In this embodiment, a torque driver was used and a fixation pressure by using the bolt 8 and the nut 9 was 12.5 kgf per bolt, amounting to 50 kgf in all four. According to the test results, however, a similar effect was also seen when a fixation pressure per bolt was a few kgf to a few ten kgf. If a cathode base substrate is a porous carbon fiber, the cathode base substrate is possible to deform in condition that a fixation pressure is more than 25 kgf. There is no such limitation in case that porous titanium, stainless fiber or the like is used as a cathode base substrate.

The pressing plates 30 were fixed by using the bolt 8 and the nut 9 in this embodiment. However, pressurization means such as lapped flat seam or caulking may be employed instead of the bolt 8 and the nut 9.

Figure 7:
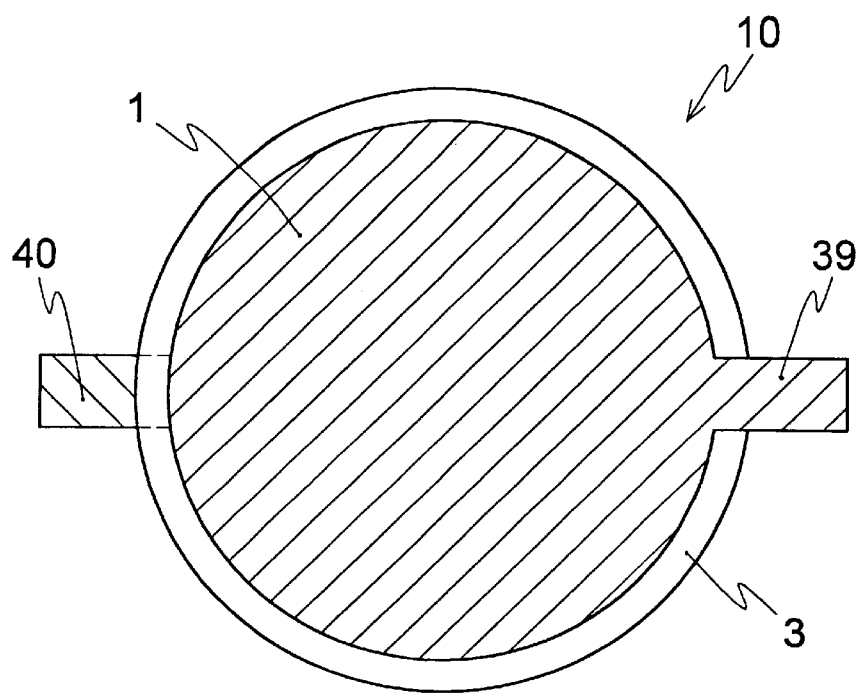
FIG. 7 is a plane view showing a construction of the electrochemical device of the ozone generator in Embodiments 1 and 8.

The shape of the jointed electrochemical device 10 was rectangle in this embodiment. But the shape may be circle having small pressure strain as shown in FIG. 7. Shapes of the metal plate 30, the insulating resin sheet 31 and the opening part 32 may also be circle according to the shape of the jointed electrochemical device 10. The same is true for the following embodiments though no particular mention is made.

The size of the pressing plate was 40 mm×50 mm in this embodiment. But, the size can be suitably selected according to the size of the jointed electrochemical device 10. The same is true for the following embodiments though no particular mention is made.

In this embodiment, it was explained that performance of an electrochemical device such as an ozone gas generator or an oxygen gas generator could be maintained steadily for a long time even at a severe, high humidity condition by pressuring the device using the pressing plates having the opening part 32 of a predetermined size. Performance of the other electrochemical devices such as a dehumidification device, a hydrogen generator and an electrochemical gas detection sensor which are similarly operated by an electrochemical reaction caused by inducing direct current to the device comprising a solid polymer electrolyte film between an anode and a cathode can also be maintained steadily for a long time because peeling of the anode catalytic layer and the cathode catalytic layer from the jointed surface with the solid polymer electrolytic film can be prevented by pressuring the device by using pressing plates having an opening part of the above predetermined size. For an anode and cathode of a hydrogen generator, there is used a material to which platinum was planted as a catalytic layer to a base comprising a porous expanded metal obtained by making a break in and expanding, for example, a thin titanium plate. The same is true for the following embodiments though no particular mention is made.

Embodiment 2

Figure 8:
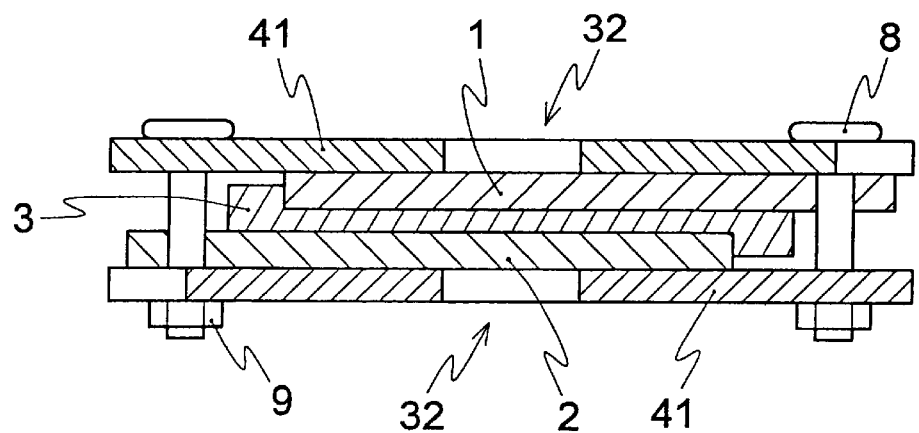
FIG. 8 is a cross sectional view showing a construction of the ozone generator in Embodiment 2.

FIG. 8 is a cross sectional view showing a construction of the electrochemical device of Embodiment 2 of the present invention. In the figure, numeral 41 is a pressing plate comprising an insulating resin sheet or an insulating ceramics sheet having the opening part 32 of a predetermined size as shown in Embodiment 1. The pressing plate comprises, for example, an insulating resin sheet or insulating ceramics sheet such as an acrylic resin, a fluorine resin, a silicone resin, a sulfone resin, an imide resin, vinyl chloride, PTFE or polycarbonate.

In Embodiment 1, the insulating resin sheet was inserted between the jointed electrochemical device 10 formed by hot press and a pair of metal plates 30 having the opening part 32 of a pre-determined size. On the other hand, the pressing plate comprising an insulating resin or insulating ceramics was employed to press the jointed electrochemical device 10 in this Embodiment.

When the pressing plate comprising an insulating resin is used, there are effects that the device becomes light, the number of necessary parts is lowered, and that preparation steps are abbreviated, though a pressing effect is reduced compared to that of using a metal.

When the pressing plate comprising an insulating ceramics is used, there are effects that the number of necessary parts is lowered and that preparation steps are abbreviated.

Embodiment 3

Figure 9:
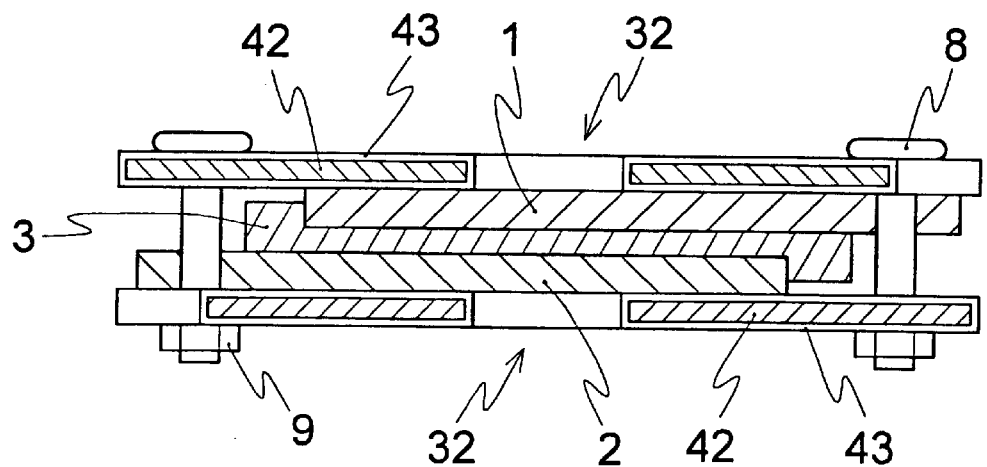
FIG. 9 is a cross sectional view showing a construction of the ozone generator in Embodiment 3.

FIG. 9 is a cross sectional view showing a construction of the electrochemical device in Embodiment 3 of the present invention. In the figure, numeral 42 shows a metal plate having the opening part 32 of a predetermined size as shown in Embodiment 1. Examples of the metal plate are iron, copper, zinc, aluminum, stainless steal and the like. Numeral 43 is an insulating resin film such as an epoxy resin, an acrylic resin, an amide resin, a fluorine resin or PTFE covering the metal plate 42. The insulating resin film such as an epoxy resin, an acrylic resin or an amide resin having a thickness of from a few tens $\mu$m to a few hundreds $\mu$m is applied to all over the surface of the metal plate 42 by electrodeposition for instance. The fluorine resin or PTFE excellent in ozone resistance is particularly preferable for the insulating resin film 43.

In this embodiment, the pressing plate is constituted by covering all surface of the metal plate 42 with the insulating resin 43. The other constructions are the same as those of Embodiment 1.

According to such a construction, the jointed electrochemical device 10 is hot-pressed firmly by using the metal plate 42 in the same manner as in Embodiment 1. Further, since the all surface of the metal plate 42 is covered with the insulating resin film 43, there is no need to consider erosion resistance to a gas such as ozone generated by the electrochemical reaction or the like when selecting a material for the metal plate 42, and copper or aluminum which is low price and excellent in thermal releasability can be selected. As a result, releasability of the generated heat in the electrochemical reaction is improved, and long and steady gas generation performance can be maintained to obtain an electrochemical device having excellent gas generation performance. Also, the metal plate 42 can be thinned since thermal releasability has been improved. Furthermore, in addition to the use of the low price metal plate 42, there is an effect that assembly become easier since there is no need to insert the insulating resin sheet 31 between a metal sheet and an electrode.

Embodiment 4

Figure 10:
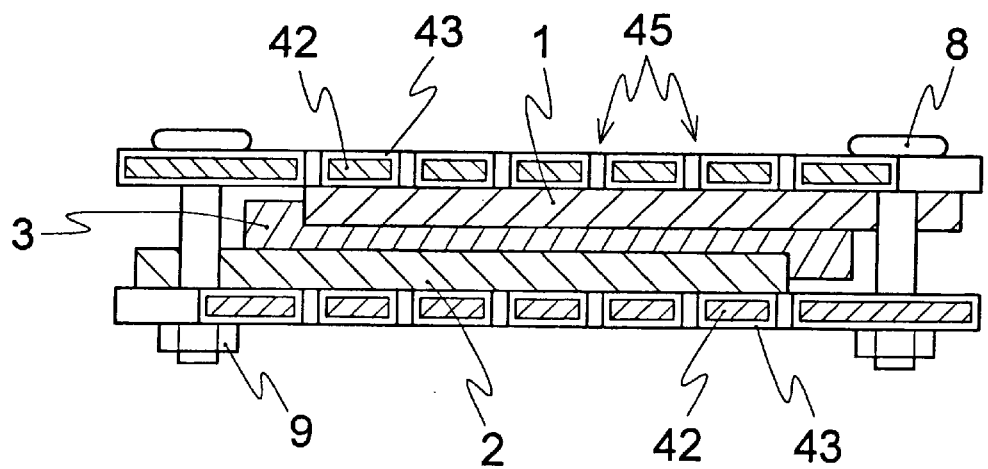
FIG. 10 is a cross sectional view showing a construction of the ozone generator of Embodiment 4.
Figure 11:
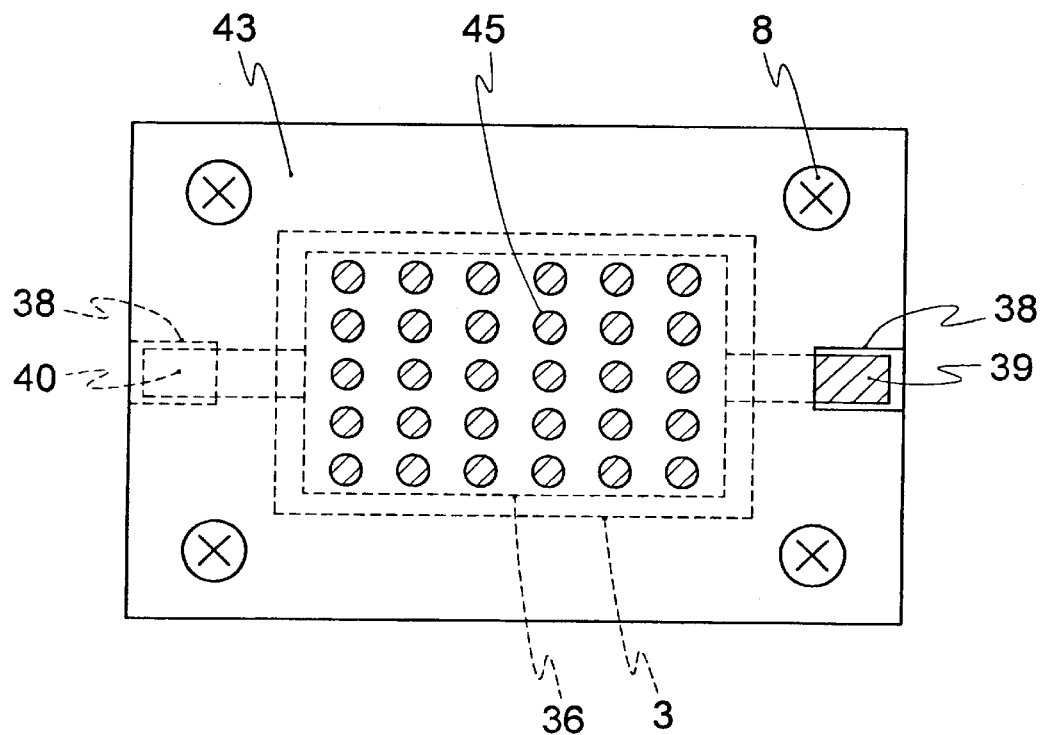
FIG. 11 is a plane view showing a construction of the ozone generator in Embodiment 4.

FIGS. 10 and 11 show a cross sectional view and a plane view of a construction of the electrochemical device in Embodiment 4 of the present invention. In the figure; 45 shows a plurality of through holes formed on the pressing plate.

In Embodiment 1, 2 and 3, the pressing plate had one rectangular or the circular opening part 32 at the center thereof, but the opening part comprises a plurality of through holes 45 in this Embodiment. An area of the opening part which equals to total area of all through holes is 5 to 90% to an area of the electrochemical reaction part 36 also in this embodiment as explained in Embodiment 1.

According to this embodiment, the electrochemical reaction part 36 of the electrochemical device 10 can be uniformly pressed and steady performance is maintained for a longer period of time.

It is preferable to make a plurality of the through hole 45 uniformly on all over the electrochemical reaction part 36. The through hole 45 is placed at the same position both for the anode side and the cathode side in FIG. 10. However, the through hole 45 may be placed in zigzag or at random. Also, in FIG. 10, a plurality of the through holes 45 is lined in cross cut, but it may be positioned in zigzag or at random if almost uniformly positioned.

A diameter of the through hole 45 is preferably a few mm or at most a few mm. A shape may be rectangular other than circle or oval.

FIGS. 10 and 11 are a case of using the pressing plate comprising the metal plate 42 covered with the insulating resin 43 as shown in Embodiment 3, but the pressing plate is not limited thereto. The pressing plate in Embodiment 1 comprising the metal plate 30 and the insulating resin sheet 31 or the pressing plate in Embodiment 2 made of an insulating resin or insulating ceramics may also be used to obtain a similar effect.

Embodiment 5

Figure 12:
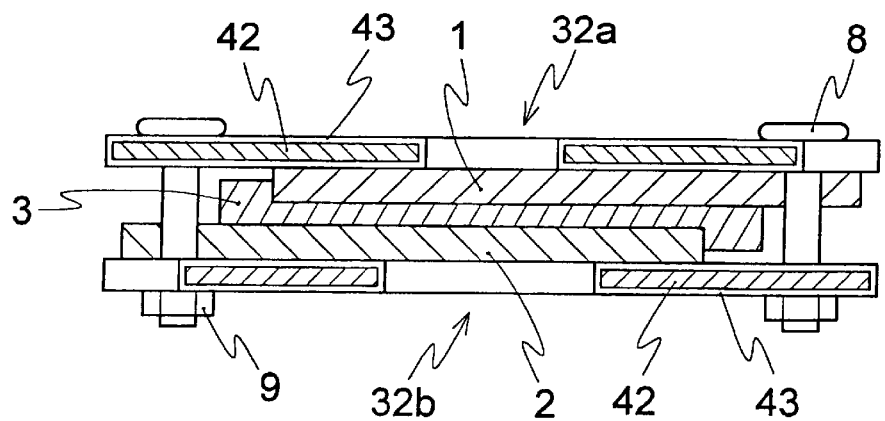
FIG. 12 is a cross sectional view showing a construction of the ozone generator in Embodiment 5.

FIG. 12 is a cross sectional view showing a construction of the electrochemical device in Embodiment 5 of the present invention. In the figure, numeral 32a indicates an opening part placed at the anode 1 side, numeral 32b an opening part placed at the cathode 2 side. In this embodiment, an area of the opening part 32b at the cathode 2 side is larger than that of the opening part 32a at the anode 1 side. An opening ratio of the opening part 32b at the cathode 2 side may be 5 to 90% as shown in Embodiment 1 and an opening ratio of the opening part 32a at the anode 1 side may be smaller than 5%.

While peeling of the joint is observed at the anode 1 due to elongation of the solid polymer electrolytic film 3 and generation of an ozone gas and an oxygen gas, peeling of the joint at the cathode 2 is smaller than that at the anode 1 since there is no stress of gas generation at the joint of the cathode 2. Accordingly, by setting the area of the opening part 32b at the cathode side larger than that of the opening part 32a at the anode side, peeling of the electrochemical device 10 is prevented, even if the device is used in a high humidity condition, the gas and heat generated by the electrochemical reaction can be released effectively to outside air, and steady performance can be maintained for a long period of time to obtain an electrochemical device having excellent gas generation performance.

FIG. 2 shows a case of using the pressing plate comprising the metal plate 42 covered with the insulating resin 43 as explained in Embodiment 3, but the metal plate is not limited thereto. A similar effect is also seen when using the pressing plate comprising the metal plate 30 and the insulating resin sheet 31 as in Embodiment 1 or using the pressing sheet 41 made of insulating resin or ceramics as in Embodiment 2.

Embodiment 6

Figure 13:
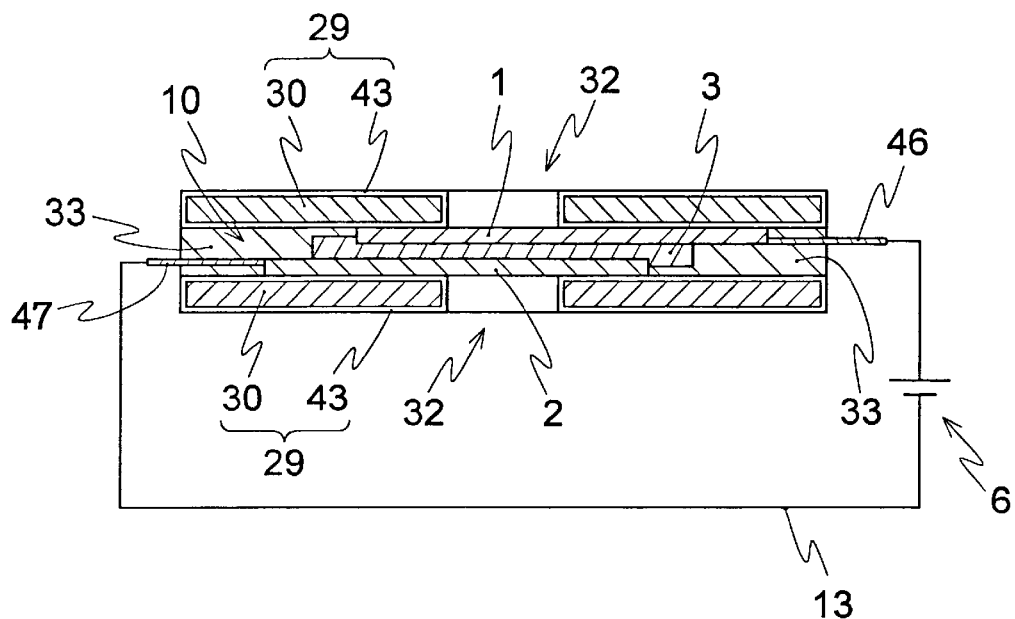
FIG. 13 is a cross sectional view showing a construction of the ozone generator of Embodiment 6.
Figure 14:
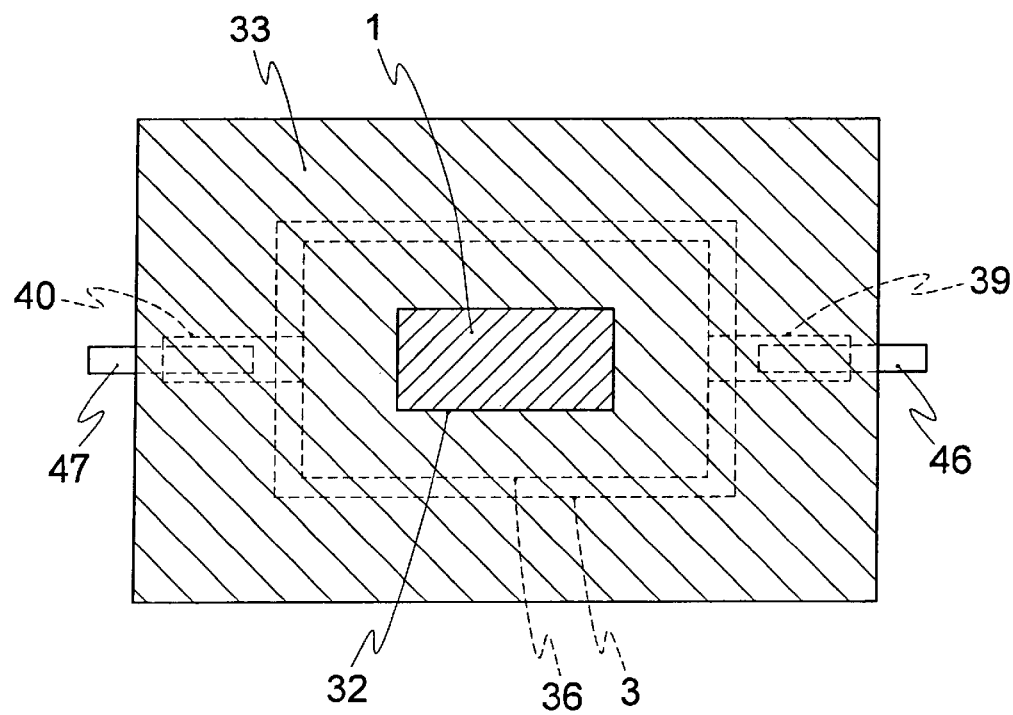
FIG. 14 is a plane view showing a construction of the ozone generator in Embodiment 6.

An electrochemical device according to Embodiment 6 of the present invention is explained below with an ozone generator as an example. FIG. 13 is a cross sectional view showing a construction of the ozone generator of Embodiment 6 of the present invention. FIG. 14 is a plane view of the construction shown in FIG. 13 observed from the anode side. A plane view showing the construction of the jointed electrochemical device of FIG. 13 is shown in FIG. 3.

In the figure, numeral 33 indicates an insulating adhesive agent comprising an epoxy resin and the like which is used to adhere a pair of the pressing plates 29. The adhesive agent is shown by hatching in FIG. 14. Numeral 46 indicates an anode lead electrode comprising a thin plate such as copper, and numeral 47 indicates a cathode lead electrode comprising a thin plate such as copper. The cable 13 is connected with the electrodes 46 and 47.

In this embodiment, the jointed electrochemical device 10 formed by hot press is placed between a pair of the pressing plates 29 having the rectangular opening part 32 whose opening ratio is for example 40% and the pressing plate 29 is bonded by using the insulating adhesive agent 33.

As a concrete example, an insulating resin such as an epoxy resin was applied by electrodeposition to all over the metal plate 30 comprising a rolled and cooled steel plate of a thickness of 1 mm having the rectangular opening part 32 whose area is 40% to that of the electrochemical reaction part 36 (i.e. an opening ratio of 40%) and the insulating resin film 43 having a thickness of 30 μm to 50 μm was formed to prepare the pressing plate 29. The insulating adhesive agent 33 was applied to the facing surfaces of the paired pressing plates 29, the jointed electrochemical device was placed to the adhesive agent 33 applied surface of the paired pressing plates 29, and pressing was effected at a pressure of 50 to 70 kgf/cm² to form the electrochemical device of this embodiment as shown in FIG. 1.

In this case, beside pressing, the paired pressing plates 29 can be bonded more firmly by hot press, for example at 50° to 200° C. with a pressure of 50 to 70 kgf/cm² to harden the softened adhesive agent 33 without change in quality. Herein, an application amount of the adhesive agent 33 is preferably at most 300 μm on one side, since the thickness of the jointed electrochemical device 10 is 600 μm.

Next, the anode lead 46 and the cathode lead 47 placed on the anode terminal 39 and the cathode terminal 40 are electrically connected with the direct current power source 6 by the cable 13, and by inducing 3 V of direct current voltage to the jointed electrochemical device 10, an ozone gas was generated.

In order to prove the effect of this embodiment, there was investigated changes of ozone and oxygen generation amount along time and results similar to that of Embodiment 1 was obtained.

As mentioned above, since the jointed electrochemical device 10 was placed between a pair of pressing plates 29 by the anode 1 and the cathode 2 and was jointed by the adhesive agent 33, performance of the electrochemical device can be maintained steadily for a long time even at a high humidity condition and a thin and light electrochemical device without the wave-shaped collectors 104 and 105 and the case 108 of Prior art Embodiment 1 can be obtained according to this embodiment.

Further, since the pressing plate 29 is formed by covering the all surface of the metal plate 30 with the insulating resin film 43, the jointed electrochemical device can be firmly connected. As a material for the metal plate 30, there is no need to consider safety against ozone, so copper or aluminum which is low price and excellent in thermal releasability can be selected. Therefore, long and steady gas generation performance can be maintained to obtain an electrochemical device having excellent gas generation performance. It is also possible to reduce the thickness of the metal plate 30, since thermal releasability is improved. Also, since the pressing plate 29 is formed by covering the all surface of the metal plate 30 with the insulating resin film 31, there is no fear of short circuit even if the pressing plates 29 contact themselves or one of the pressing plate contacted with the anode 1 (including the anode terminal 39 and the lead 46) or the cathode 2 (including the cathode terminal 40 and the lead 47).

In addition, since the jointed electrochemical device 10 is completely insulated by the insulating resin such as an epoxy resin, the device of the present invention can be used in water if the leads 46 and 47 are covered with the similar insulating resin and are connected to the direct current 6 by using the cable 13 covered with an insulating resin such as a vinyl resin having water durability according to this embodiment. The same is true for the following embodiments though no particular mention is made.

This Embodiment shows a case where the pressing plate 29 comprises the metal plate 30 and the insulating resin 43 covering the metal plate 30, but the pressing plate is not limited thereto. The pressing plate made of an insulating resin or ceramics may be used as in Embodiment 2, to obtain a similar effect.

The pressing plate 29 can be formed only by the metal plate 30. In this case, stainless steel and the like are suitable as a material for the metal plate 30 in consideration of erosion property for the gas generated by the electrochemical reaction, which leads to a sufficient pressing effect by the metal plate 30 and the preparation steps are abbreviated as well.

A pressure for bonding of the pressing plate 29 was set to 50 to 70 kgf/cm² in the above embodiment, but a similar effect was also seen when a pressure was set to a few kgf/cm² to 100 kgf/cm² according to the test results.

Embodiment 7

Figure 15:
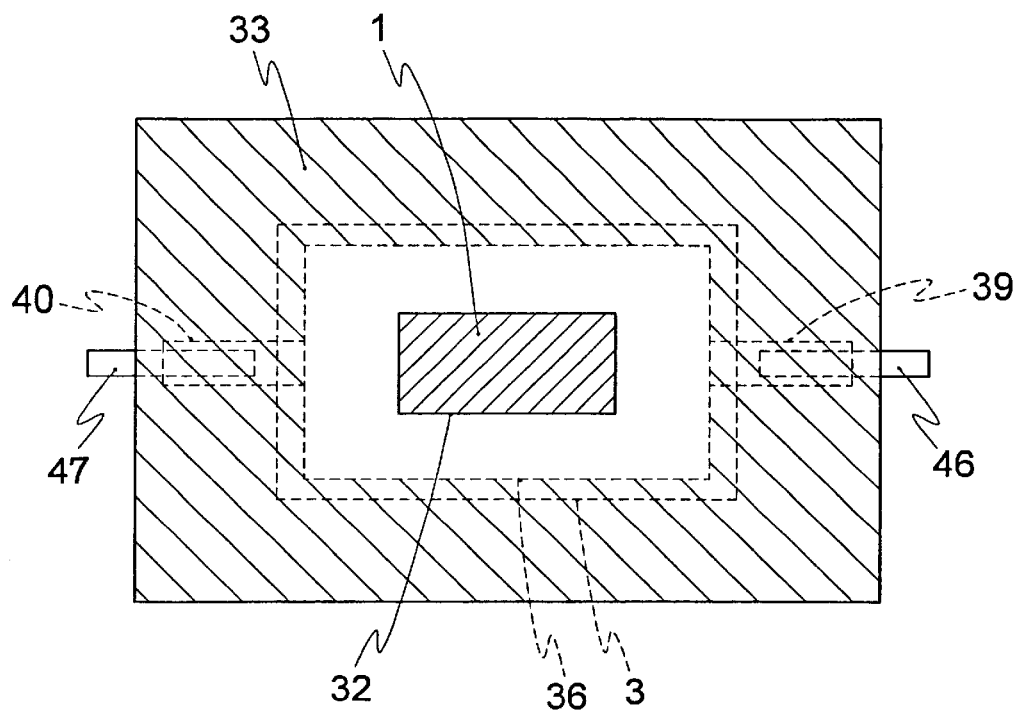
FIG. 15 is a plane view showing a construction of the ozone generator in Embodiment 7.

FIG. 15 is a plane view showing a construction of the jointed electrochemical device in Embodiment 7 of the present invention.

The adhesive agent 33 was applied to all over the pressing surface except for the opening part 32 of the pressing plate 29 in Embodiment 6. In this embodiment, however, the adhesive agent 33 was applied to the pressing plate 29 except for the electrochemical reaction part 36 as shown in FIG. 15.

In this case, though pressing effect is slightly low compared to that of Embodiment 6 since the pressing plate 29 does not adhere to the electrochemical reaction part 36 of the jointed electrochemical device, ventilation of a gas and the like through the space is possible, and there is an effect that performance of the electrochemical device is improved.

An application area of the insulating adhesive agent 33 can be suitably selected from an area excluding the opening part 32 to an area excluding the electrochemical reaction part.

Embodiment 8

FIG. 7 is a plane view showing a construction of the essential part of the ozone generator in Embodiment 8 of the present invention. Embodiments 6 and 7 show a case where the shape of the jointed electrochemical device is rectangular, but the shape may be circle having small pressure strain as shown in FIG. 7. Shapes of the pressing plate 29 and the opening part 32 may also be circle according to the shape of the jointed electrochemical device 10.

Embodiment 9

Embodiments 6 to 8 show a case of using the pressing plates 29 whose facing surfaces are applied with the insulating adhesive agent 33 except for at least the opening part to bond the jointed electrochemical device. The pressing plates are placed at the anode side and the cathode side of the jointed electrochemical device with a sheet of the insulating adhesive agent therebetween and the pressing plates are jointed by hot press in this Embodiment.

Concretely, the jointed electrochemical device is inserted between two metal plates having a thickness of 1 mm with the opening part as in Embodiment 6 with a sheet of insulating and thermosetting adhesive agent such as an epoxy resin having the same-shaped opening part as that of the metal plate therebetween. After that, the device was bonded by hot pressing.

A sheet of the insulating and thermosetting adhesive agent preferably has a thickness of a few ten $\mu$m to a few hundred $\mu$m. The agent is hot pressed preferably at a temperature of 50° to 200° C. with a pressure of a few kgf/cm$^2$ to 100 kgf/cm$^2$.

According to this Embodiment, the step of applying the insulating adhesive agent to the pressing surface of the pressing plates having the opening part can be abbreviated, and without unevenness of application, the jointed electrochemical device can be connected with the pressing plates uniformly and easily by the insulating adhesive agent.

The pressing plate may be not only the metal plate, but also a metal plate covered with an insulating resin film, an insulating resin plate or an insulating ceramics plate as explained in Embodiment 6.

Embodiment 10

Figure 16:
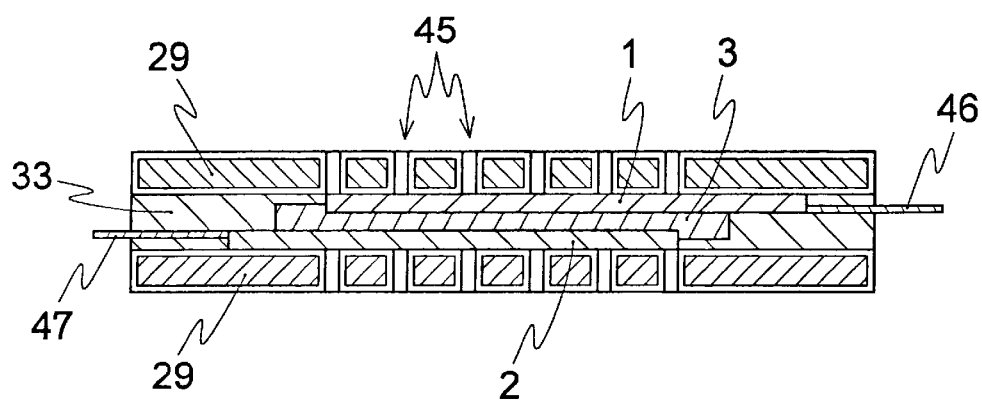
FIG. 16 is a cross sectional view showing a construction of the ozone generator of Embodiment 10.
Figure 17:
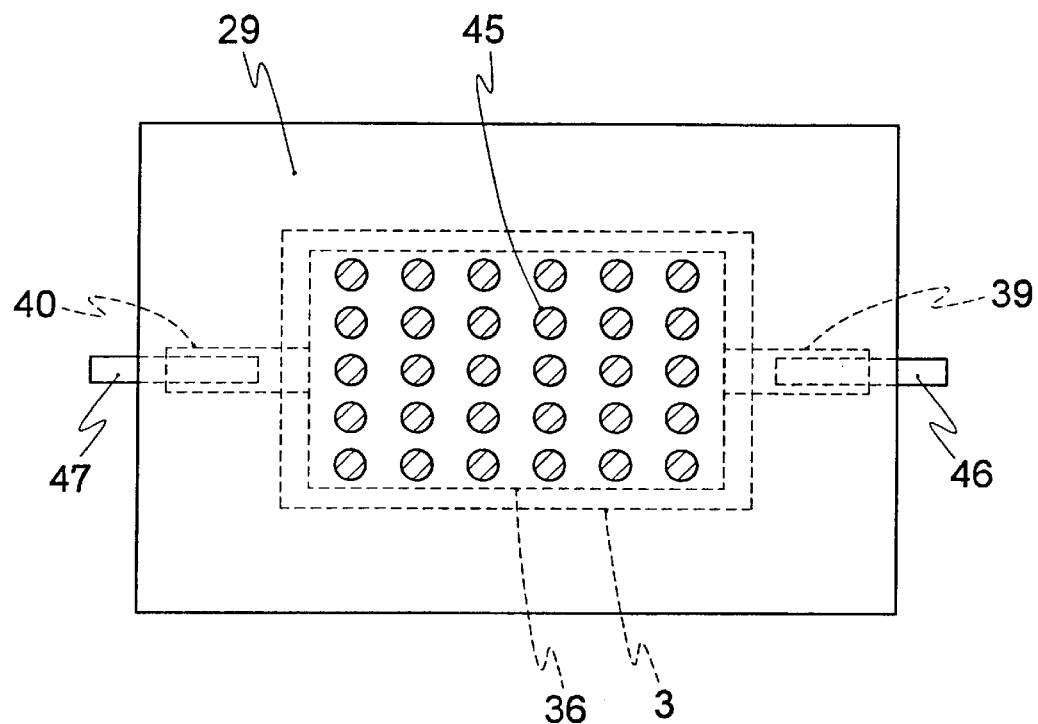
FIG. 17 is a plane view showing a construction of the ozone generator in Embodiment 10.

FIGS. 16 and 17 are a cross sectional view and a plane view of a construction of the electrochemical device in Embodiment 10 of the present invention.

Embodiments 6 to 9 show a case where the pressing plate 29 has one rectangular or circle opening part 32 at the center thereof. But the opening part comprises a plurality of through holes in this embodiment. An area of the opening part which equals the total area of all through holes is 5 to 90% to an area of the electrochemical reaction part 36 also in this embodiment as explained in Embodiment 6.

According to this embodiment, all surface of the electrochemical reaction part 36 of the electrochemical device 10 can be uniformly pressed to maintain steady performance for a longer period of time.

Embodiment 11

Figure 18:
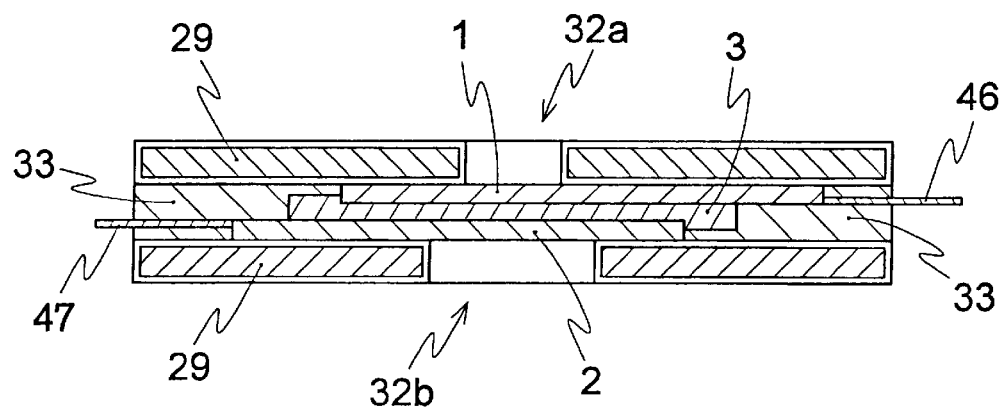
FIG. 18 is a cross sectional view showing a construction of the ozone generator in Embodiment 11.

FIG. 18 is a cross sectional view showing a construction of the electrochemical device in Embodiment 11 of the present invention. In this embodiment, an area of the opening part 32b at the cathode 2 side is larger than that of the opening part 32a at the anode side. An opening ratio of the opening part 32b at the cathode side may be 5 to 90% as shown in Embodiment 6 and an opening ratio of the opening part 32a at the anode side may be smaller than 5%.

Similarly to Embodiment 5, by setting the area of the opening part 32b at the cathode side larger than that of the opening part 32a at the anode side, peeling of the electrochemical device 10 is prevented even if the device is used at a high humidity condition, the gas and heat generated by the electrochemical reaction can be effectively released to outside air, and steady performance can be maintained for a long period of time to obtain an electrochemical device having excellent gas generation performance.

FIG. 18 shows a case of using the pressing plate 29 comprising a metal plate covered with insulating resin film, but the pressing plate is not limited thereto. A similar effect is also seen by using a pressing plate comprising only a metal plate or by using a pressing plate made of an insulating resin or ceramics.

The construction of each pressing plate at the anode side and the cathode side was the same as in Embodiments 1 to 11, but the construction may be different.

For instance, a pressing plate having a plurality of through holes can be used at the anode 1 side while a pressing plate having one rectangular or circle opening part at the center thereof can be used at the cathode 2 side. In this case, there is an effect that the gas and heat generated at the electrochemical reaction part 36 can be effectively released to the outside air.

Embodiment 12

Figure 19:
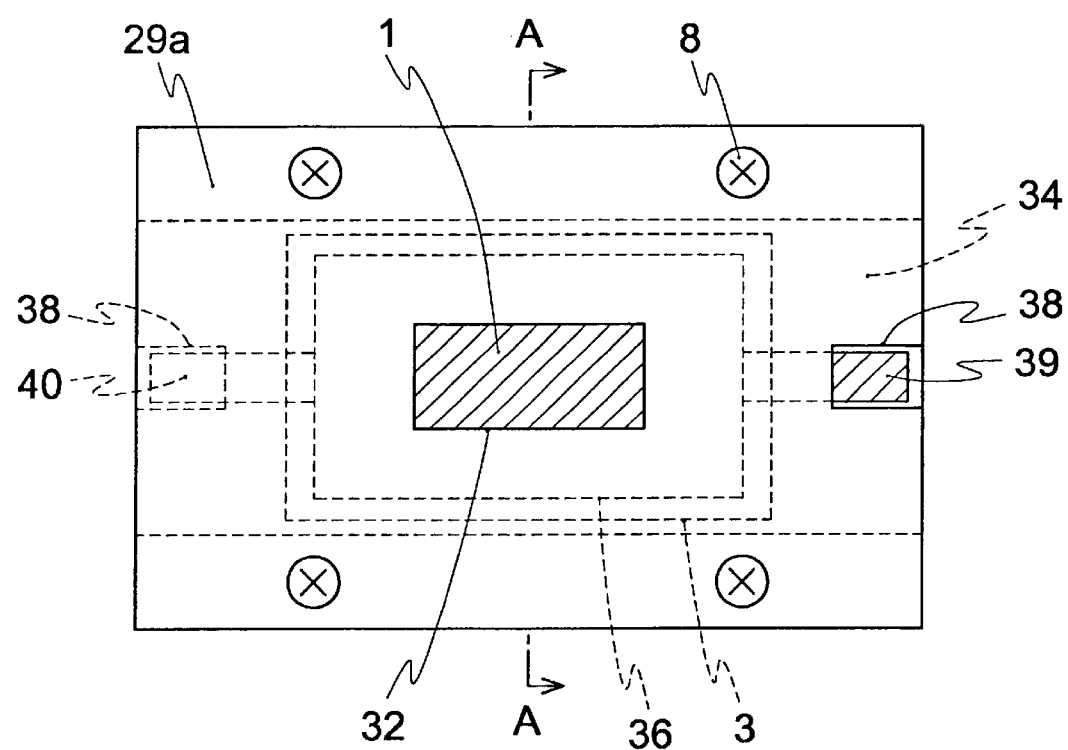
FIG. 19 is a plane view showing a construction of the ozone generator in Embodiment 12.
Figure 20:
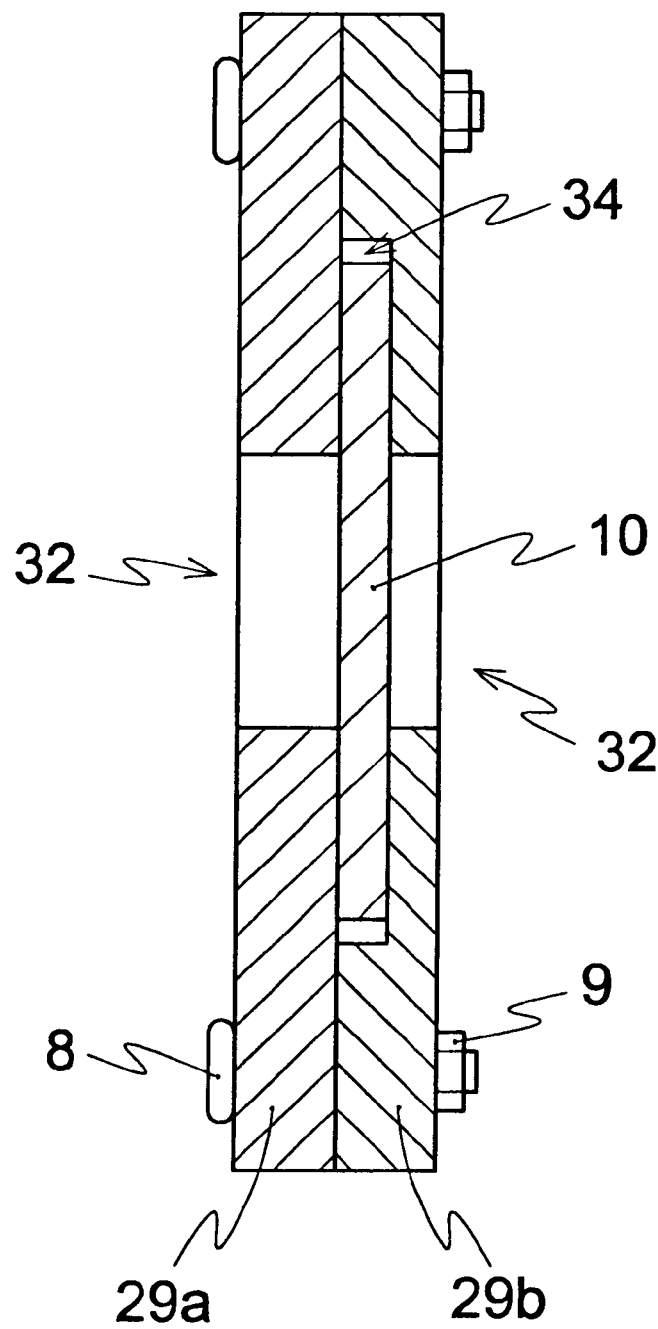
FIG. 20 is a cross sectional view taken on line A—A in FIG. 19 showing a construction of the ozone generator in Embodiment 12.
Figure 21:
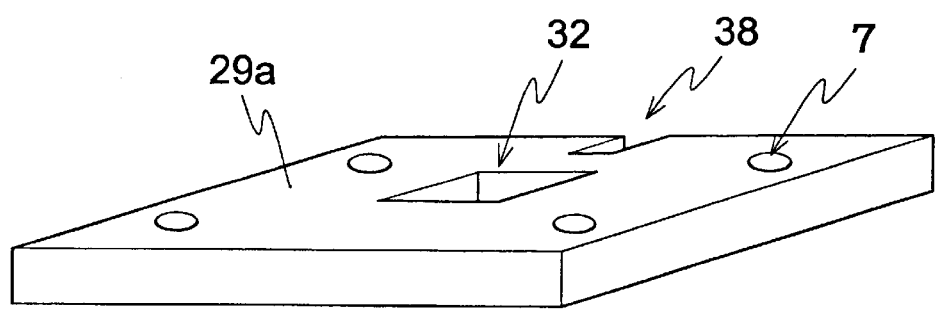
FIG. 21 is a perspective view showing the first pressing plate of the ozone generator in Embodiment 12.
Figure 22:
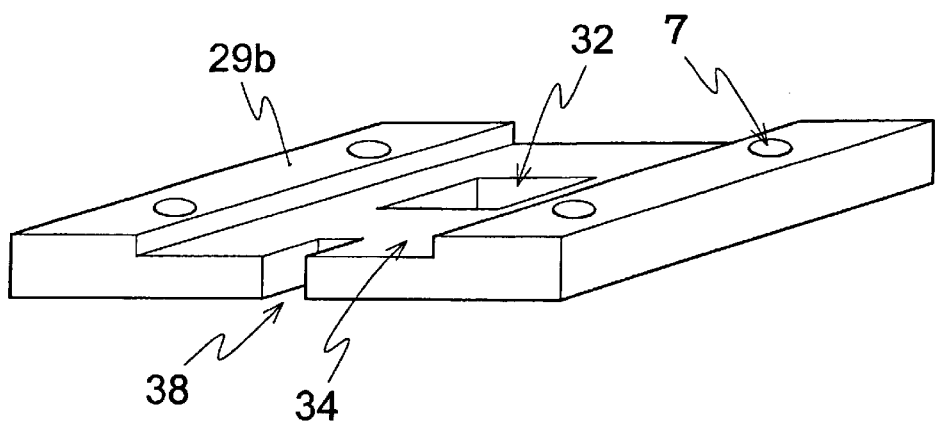
FIG. 22 is a perspective view showing the second pressing plate of the ozone generator in Embodiment 12.

An electrochemical device according to Embodiment 12 of the present invention is explained below with an ozone generator as an example. FIG. 19 is a plane view showing a construction of the ozone generator in Embodiment 12 of the present invention. FIG. 20 shows a cross sectional view taken on line A—A in FIG. 19; FIG. 21 is a perspective view showing one of the pressing plates in FIG. 19; FIG. 22 is a perspective view showing the other pressing plates in FIG. 19; FIG. 3 is a plane view showing a construction of the jointed electrochemical device of the FIG. 19; and FIG. 23 is a cross sectional view showing a situation where the jointed electrochemical device is inserted into the concave part of the pressing plate.

In the figures, numeral 7 indicates a bolt hole; numeral 29a one of the pressing plates (hereinafter referred to as first pressing plate); numeral 29b the other pressing plate (hereinafter referred to as second pressing plate); and numeral 34 indicates the concave part positioned on the second pressing plate 29b to which the jointed electrochemical device 10 is inserted.

In this embodiment, the jointed electrochemical device 10 formed by hot press was inserted between the first pressing plate 29a having a rectangular opening part 32 whose opening ratio is 40% and the second pressing plate 29b having the same opening part 32 and the concave part 34 for the insertion of the jointed electrochemical device 10, and the two plates were fixed by using the bolt 8 and the nut 9.

Figure 23:
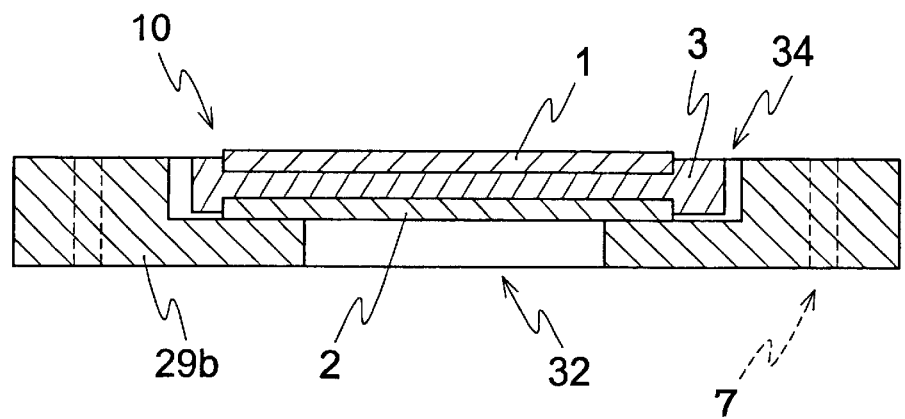
FIG. 23 is a cross sectional view showing a situation where the jointed electrochemical device is inserted into the second pressing plate of the ozone generator in Embodiment 12.

Concretely, as shown in FIG. 23, a depth of the concave part 34 formed in the second pressing plate 29b is, for example, a few ten μm shallower than that of the jointed electrochemical device 10. Then, an projected part of the jointed electrochemical device 10 was inserted into the concave part 34 of the second pressing plate 29b. After that, the first pressing plate 29a was placed and pressing was effected by using the bolt 8 and bolt 9 at a pressure of a few kgf to a few ten kgf using a torque driver. Accordingly, by setting a depth of the concave part 34 such that the jointed electrochemical device 10 projects from the concave part 34 for a few ten μm, the jointed electrochemical device 10 is compressed due to pressing by the bolt 8 and bolt 9, the first pressing plate 29a and the second pressing plate 29b is closely connected, and by using the first pressing plate 29a and the second pressing plate 29b, the jointed electrochemical device 10 is uniformly and firmly pressed. There is an advantage that a pressing strength, by which the jointed electrochemical device 10 is pressed, can be precisely controlled by arranging a projection height of the jointed electrochemical device 10 in a rage of a few μm to about 100 μm.

Next, the anode terminal 39 and the cathode terminal 40 appeared from the cut part 38, which was formed at the pressing plates 29a and 29b, was connected to a direct current power source and about 3 V of direct current voltage was induced to the jointed electrochemical device 10.

In order to prove the effect of this embodiment, there were investigated changes of ozone and oxygen generation amount along time and results similar to that of Embodiment 1 was obtained.

As in the above, the jointed electrochemical device 10 was formed by pressing with use of a pair of pressing plates 29a and 29b having the opening part 32 and the concave part 34 for insertion of the jointed electrochemical device 10 and a use of the bolt 8 and the nut 9 according to this embodiment. Therefore, performance of the electrochemical device can be maintained steadily for a long time even at a high humidity condition. And a thin and light electrochemical device without the wave-shaped collectors 104 and 105 and the case 108 in Prior art 1 can be obtained according to this embodiment.

As the second pressing plate 29b had the concave part 34 for inserting the jointed electrochemical device 10, strain of the pressing plates 29a and 29b become smaller in pressing to uniformly and firmly press the jointed electrochemical device 10.

As the pressing plate 29a and 29b, there can be used a combination of a metal plate and an insulating resin sheet placed between the metal sheet and the jointed electrochemical device 10, a metal plate totally covered with an insulating resin film, an insulating resin plate, an insulating ceramics plate and the like.

In case of using the combination of the metal plate and the insulating sheet, the jointed electrochemical device 10 can be pressed uniformly and firmly by the metal plate.

This embodiment shows a case where the concave part 34 is formed only in the second pressing plate 29b. But the concave part may be formed in the first pressing plate 29a and the depth thereof is the total of the depth of the both concave parts 34 which is shallower than the thickness of the jointed electrochemical device 10 for a predetermined depth as explained in this embodiment. The same is true for the following embodiments though no particular mention is made.

Embodiment 13

Figure 24:
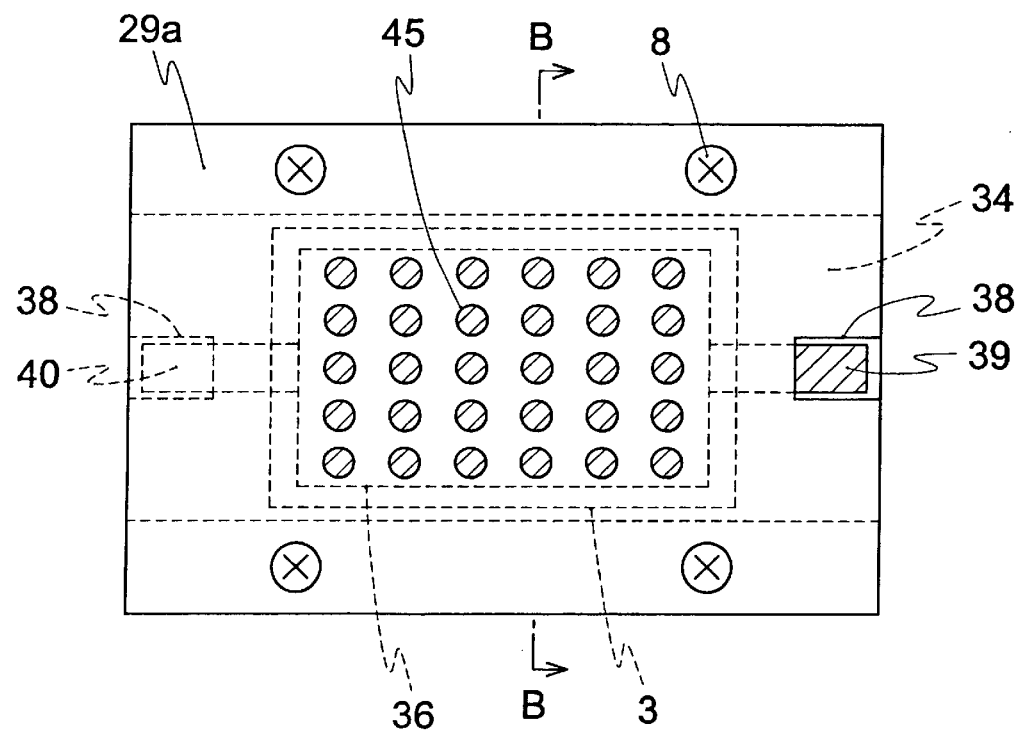
FIG. 24 is a plane view showing a construction of the ozone generator in Embodiment 13.
Figure 25:
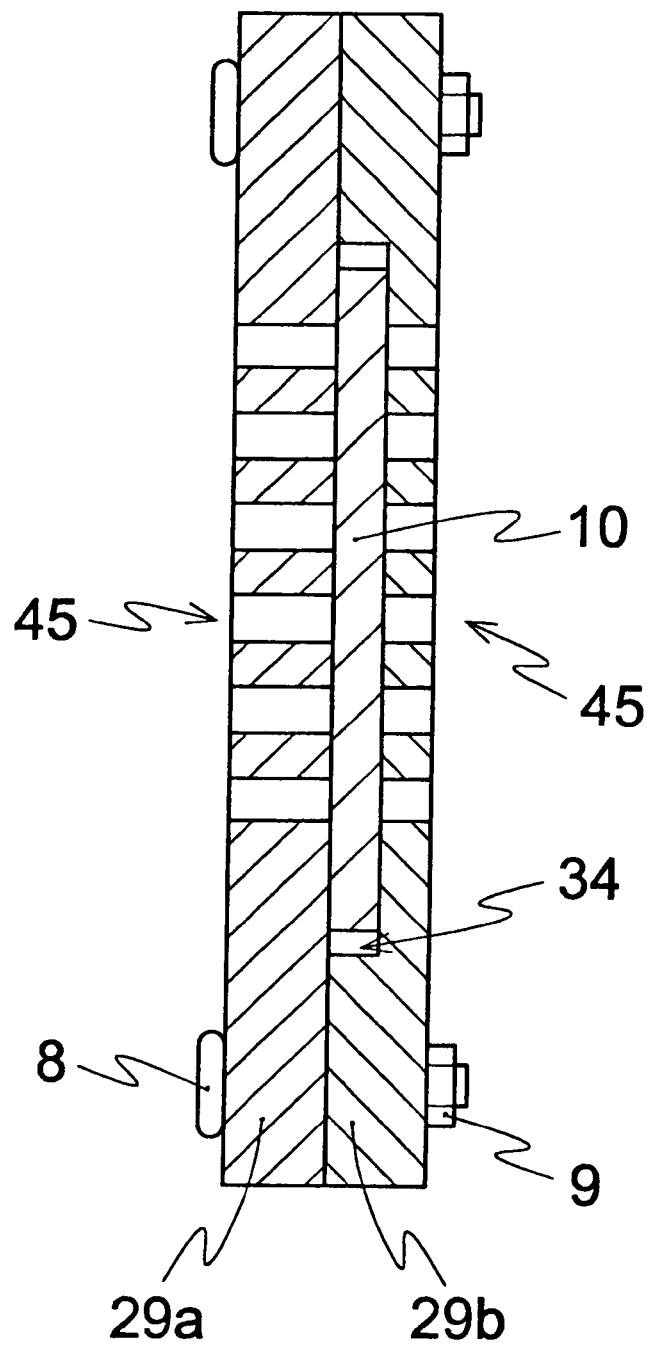
FIG. 25 is a cross sectional view taken on line B—B in FIG. 24 showing a construction of the ozone generator in Embodiment 13.

FIG. 24 is a plane view showing a construction of the jointed electrochemical device in Embodiment 13 of the present invention. FIG. 25 shows a cross sectional view taken on line B—B in FIG. 24.

Embodiment 12 shows a case where the pressing plates 29a and 29b had one rectangular or circle opening part 32 at the center thereof. The opening part in this embodiment comprises a plurality of through holes in this embodiment. An area of the opening part which equals the total area of all through holes is 5 to 90% to that of the electrochemical reaction part 36 also in this embodiment as explained in Embodiment 12. Accordingly, the electrochemical reaction part 36 of the electrochemical device 10 can be uniformly pressed and steady performance is maintained for a longer period of time as explained in Embodiment 4.

Embodiment 14

Figure 26:
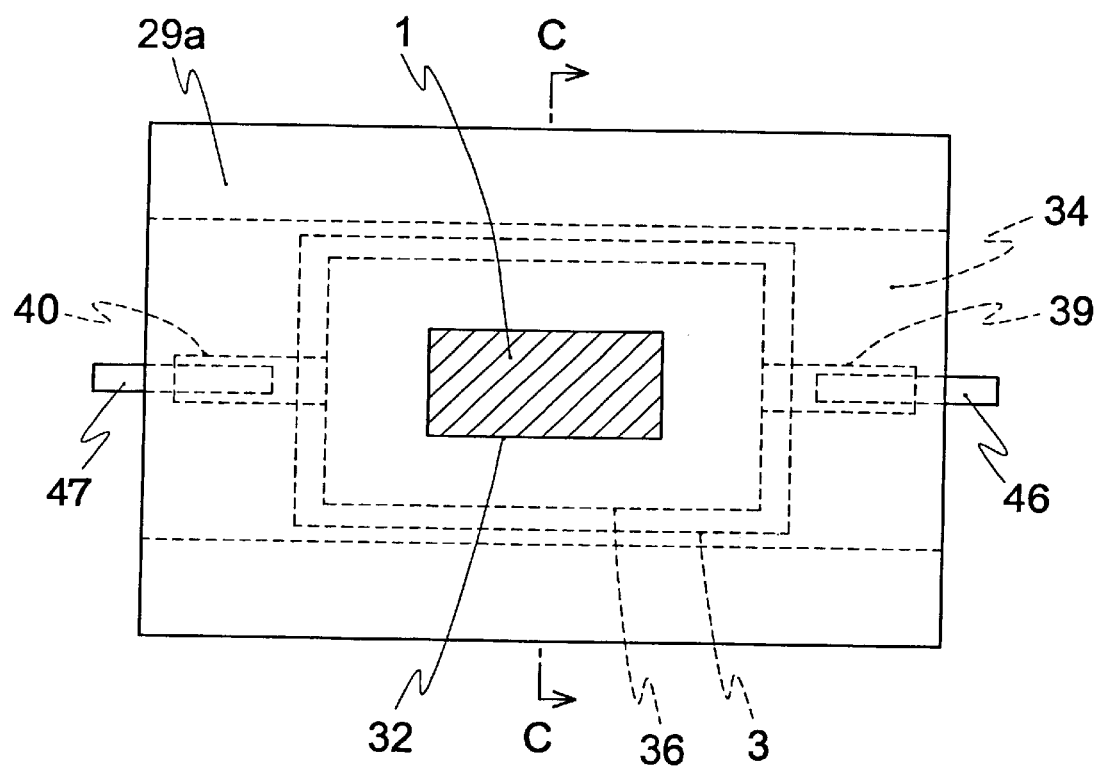
FIG. 26 is a plane view showing a construction of the ozone generator in Embodiment 14.
Figure 27:
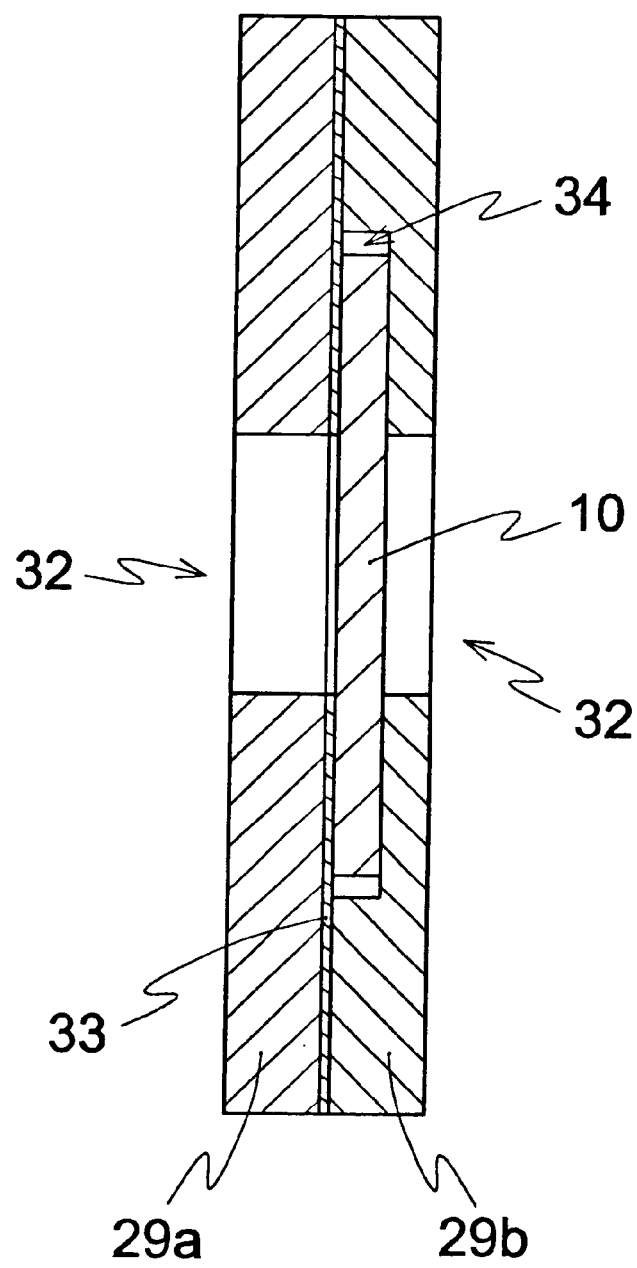
FIG. 27 is a cross sectional view taken on line C—C in FIG. 26 showing a construction of the ozone generator in Embodiment 14.
Figure 28:
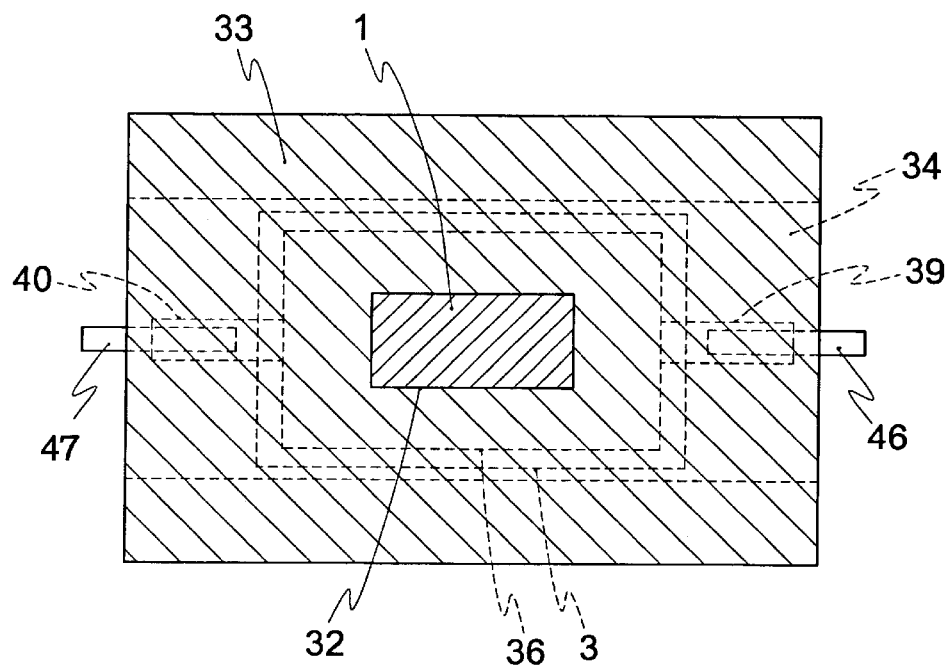
FIG. 28 is a plane view showing a construction of the ozone generator in Embodiment 14.

FIGS. 26 and 28 are a plane view showing a construction of the electrochemical device according to the Embodiment 13 of the present invention and FIG. 27 shows a cross sectional view taken on line C—C in FIG. 26. Application area of the adhesive agent 33 is shown by hatching in FIG. 28.

Embodiment 12 and 13 show a case where the jointed electrochemical device 10 is pressed by fixation of the first pressing plate 29a and the second pressing plate 29b by using the bolt 8 and the nut 9. But the pressing of the jointed electrochemical device 10 is conducted by jointing the first pressing plate 29a and the second pressing plate 29b with the insulating adhesive agent 33 in this embodiment. Accordingly, a lighter and more compact electrochemical device can be obtained compared to conducting fixation by using the bolt 8 and the nut 9.

As shown in FIG. 23, a part of the jointed electrochemical device 10 is projected and inserted into the concave part 34 of the second pressing plate 29b. After that, as shown in FIGS. 27 and 28, the first pressing plate 29a having the insulating adhesive agent 33 such as an epoxy resin on the pressing surface is placed and pressing is conducted at a pressure of a few $kgf/cm^2$ to a few hundred $kgf/cm^2$, preferably at a few ten $kgf/cm^2$, to bond the first pressing plate 29a and the second pressing plate 29b to form the electrochemical device of this embodiment as in FIGS. 27 and 28. In this case, beside pressing, the paired pressing plates 29 and 30 can be bonded more firmly by hot press, for example at 50° to 200° C. with a pressure of a few $kgf/cm^2$ to 100 $kgf/cm^2$ to harden the softened adhesive agent 33 without change in quality.

If a cathode base substrate is a porous carbon fiber, the cathode base substrate is possibly deformed in condition that a pressing pressure is more than 100 $kgf/cm^2$. However, there is no such limitation in case that porous titanium, stainless fiber or the like is used as the cathode 2 base substrate.

As mentioned above, if the pressing plate 30 is equipped with the concave part 34, space between the first pressing plate 29a and the second pressing plate 29b decreases and an application amount of the insulating adhesive agent become small. In addition, since the pressing plates 29a and 29b are closely connected due to compression of the jointed electrochemical device 10 after pressing, strain of the two pressing plates does not arise easily, and the jointed electrochemical device 10 can be pressed uniformly and firmly by using the bonded first and second pressing plates 29a and 29b.

As the pressing plates 29a and 29b, a metal plate, a metal plate covered with an insulating resin film, an insulating resin plate, an insulating ceramics plate or the like can be employed as in Embodiment 6. But since the insulating adhesive agent 33 is used for jointing the device, the insulating resin sheet as explained in Embodiment 1 is not needed if a metal plate is used.

While peeling of the jointed surface is observed at the anode 1 due to elongation of the solid polymer electrolytic film 3 and generation of an ozone gas or an oxygen gas, peeling of the jointed surface at the cathode 2 is smaller than that at the anode 2 since there is no stress of gas generation at the jointed surface of the cathode 2. Accordingly, the anode 1 of the jointed electrochemical device 10 may be positioned at the side of the first pressing plate 29a to which the adhesive agent 33 is applied.

The adhesive agent 33 may be applied to the second pressing plate 29b or to both of the pressing plates 29a and 29b.

Embodiment 15

Figure 29:
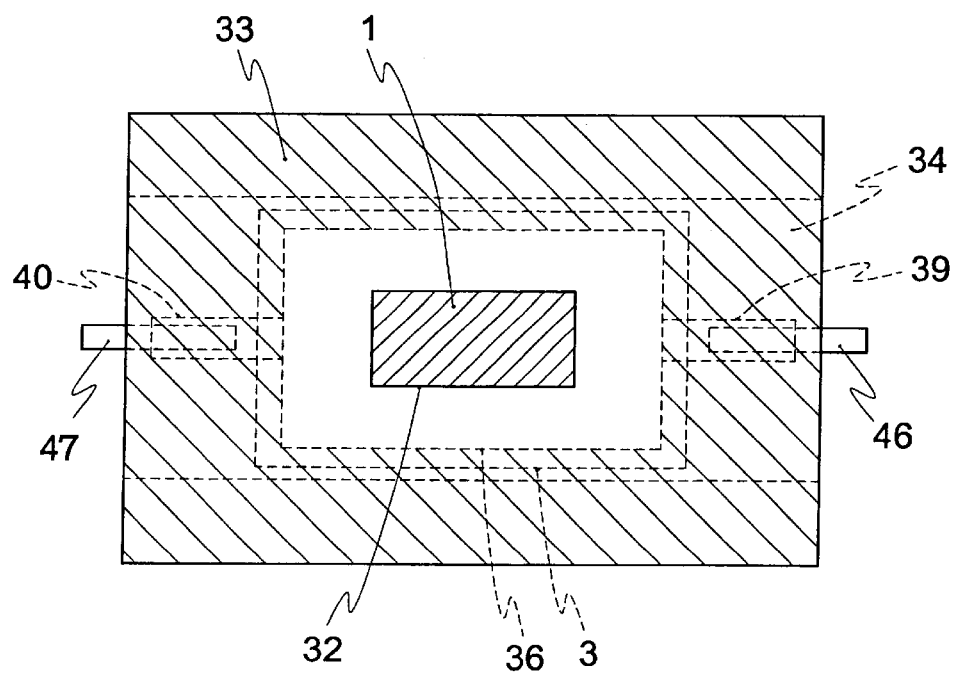
FIG. 29 is a plane view showing a construction of the ozone generator in Embodiment 15 excluding the first pressing plate shown in FIG. 10.

FIG. 29 is a plane view showing a construction of the jointed electrochemical device in Embodiment 15 of the present invention.

The insulating adhesive agent is applied to all over the pressing surface of the pressing plates 29a and 29b except for the opening part 32 in Embodiment 14 as in FIG. 28. But in this embodiment, the insulating adhesive agent 33 is applied to the pressing plates 29a and 29b excluding the electrochemical reaction part 36 as shown in FIG. 29.

In this case, the pressing plates 29a and 29b do not adhere to the electrochemical reaction part 36, ventilation of a gas and the like through the space is possible, and there is an effect that performance of the electrochemical device is improved though pressing effect is slightly inferior to that in Embodiment 14.

An application region of the insulating adhesive agent 33 can be suitably selected from a region excluding the opening part 32 to a region excluding the electrochemical reaction part 36.

Embodiment 16

Figure 30:
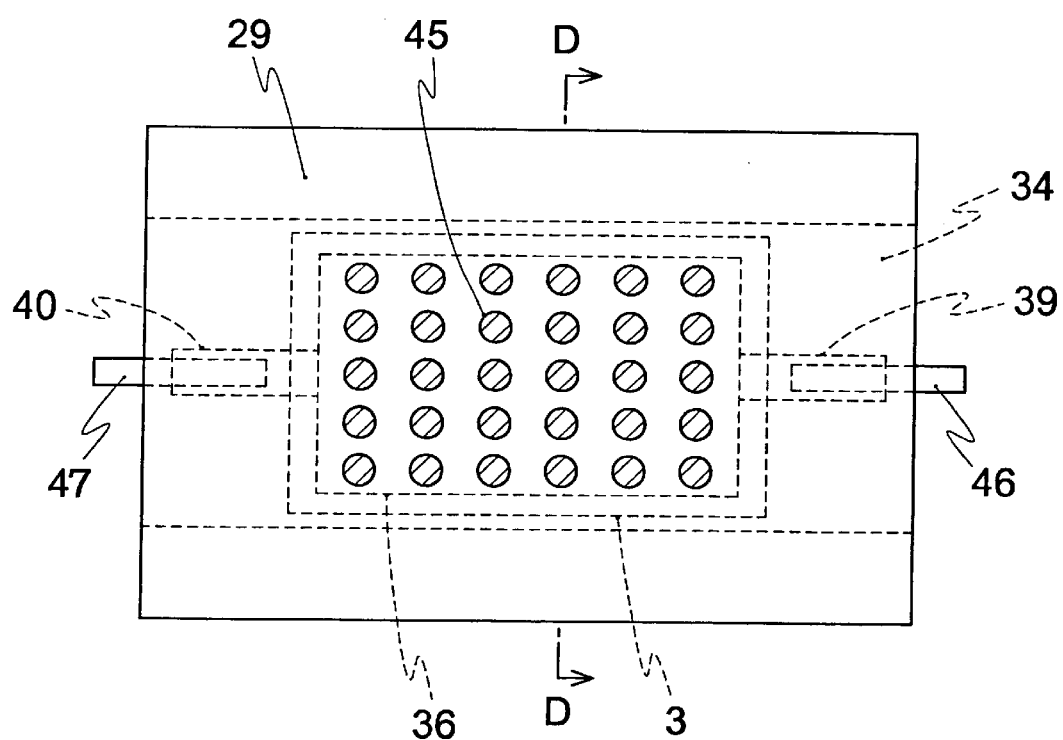
FIG. 30 is a plane view showing a construction of the ozone generator in Embodiment 16.
Figure 31:
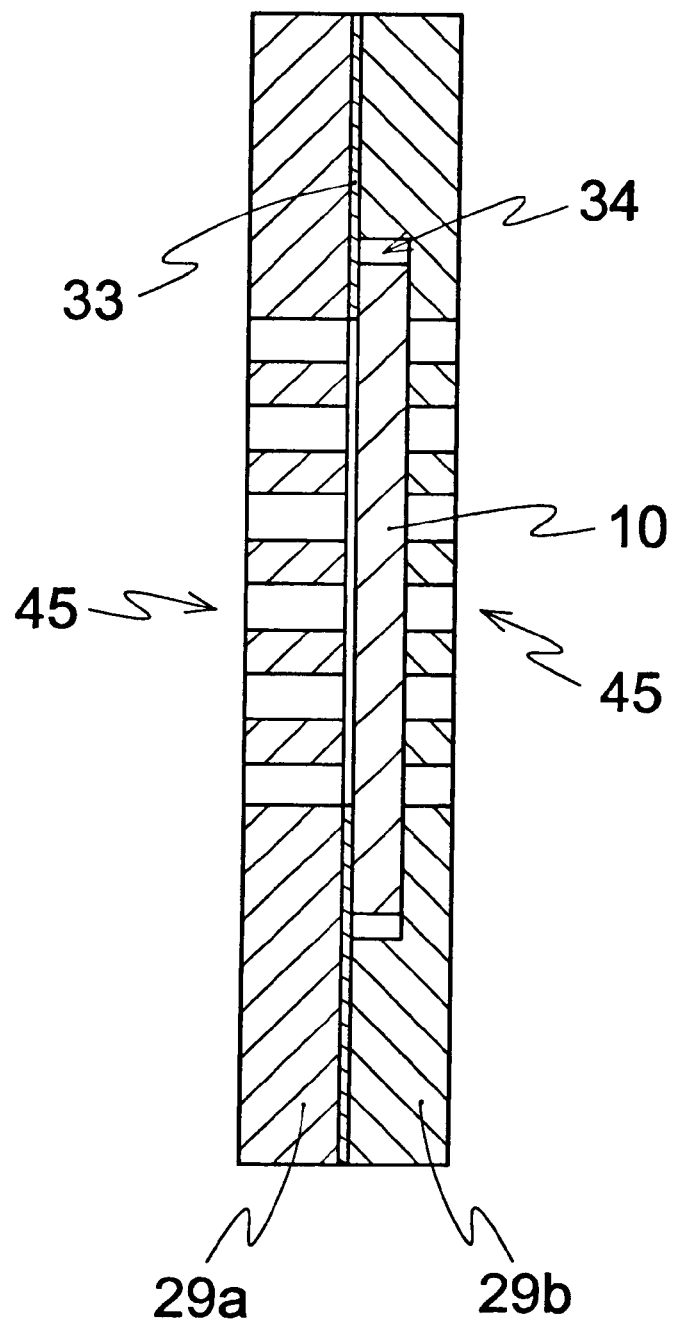
FIG. 31 is a cross sectional view taken on line D—D in FIG. 30 showing a construction of the ozone generator in Embodiment 16.
Figure 32:
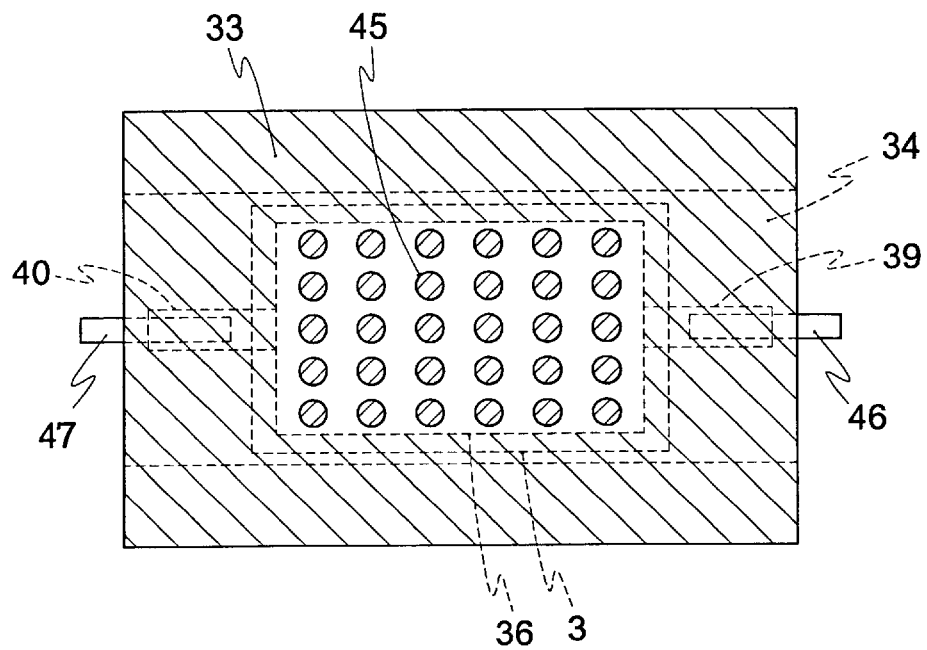
FIG. 32 is a plane view showing a construction of the ozone generator in Embodiment 16.

FIGS. 30 and 32 are a plane view showing a construction of the electrochemical device according to the Embodiment 16 of the present invention, and FIG. 31 shows a cross sectional view taken on line D—D in FIG. 31.

Embodiment 14 and 15 show a case where the pressing plate 29a and 29b have one rectangular or circle opening part 32 at the center thereof, but the opening part comprises a plurality of through holes 45 in this Embodiment. Accordingly, the electrochemical reaction part 36 of the electrochemical device 10 can be uniformly pressed and steady performance is maintained for a longer period of time.

Embodiment 17

Embodiments 14 to 16 show a case of using the pressing plates 29 whose facing surfaces are applied with the insulating adhesive agent 33 except for at least the opening part to bond the first and second pressing plates 29a and 29b. In this embodiment, a sheet-shaped insulating adhesive agent such as an epoxy resin is used instead of the insulating adhesive agent. The sheet-shaped insulating adhesive agent having an opening part is placed between the first pressing plate having an opening part and the second pressing plate having an opening part and a concave part to which a jointed electrochemical device is inserted.

After that, hot press was conducted at a temperature of 50° to 200° C. with a pressure of a few kgf/cm$^2$ to 100 kgf/cm$^2$ to joint the first and the second pressing plate. In this case, a thickness of the sheet-shaped insulating adhesive agent is preferably a few $\mu$m to a few ten $\mu$m.

A shape and size of the opening part of the sheet-shaped insulating adhesive agent may be the same or larger compared to those of the pressing plate, but preferably smaller than the size of the electrochemical reaction part.

According to this embodiment, similarly to Embodiment 8, the step of applying insulating adhesive agent to pressing surface of the pressing plates having the opening part can be abbreviated, and without unevenness of application, the jointed electrochemical device can be connected with the pressing plates having an opening part uniformly and easily by the adhesive agent.

The pressing plate may be a metal plate, a metal plate covered with an insulating resin film, an insulating resin plate, an insulating ceramics plate or the like as explained in Embodiment 6. In particular, if a metal plate such as stainless steal is used and the opening part of the sheet-shaped insulating adhesive agent is set larger than that of the pressing plate, a lead can be connected to the metal plate, and there is no need to place anode and cathode terminals, leading to an effect of saving an electrode material.

Embodiment 18

Figure 33:
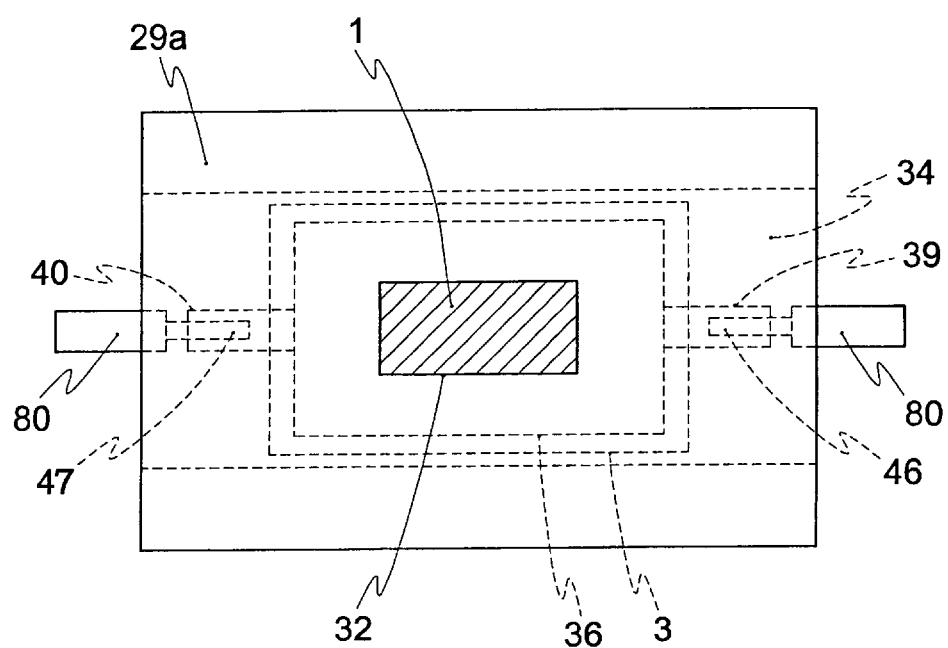
FIG. 33 is a plane view showing a construction of the ozone generator in Embodiment 18.
Figure 34:
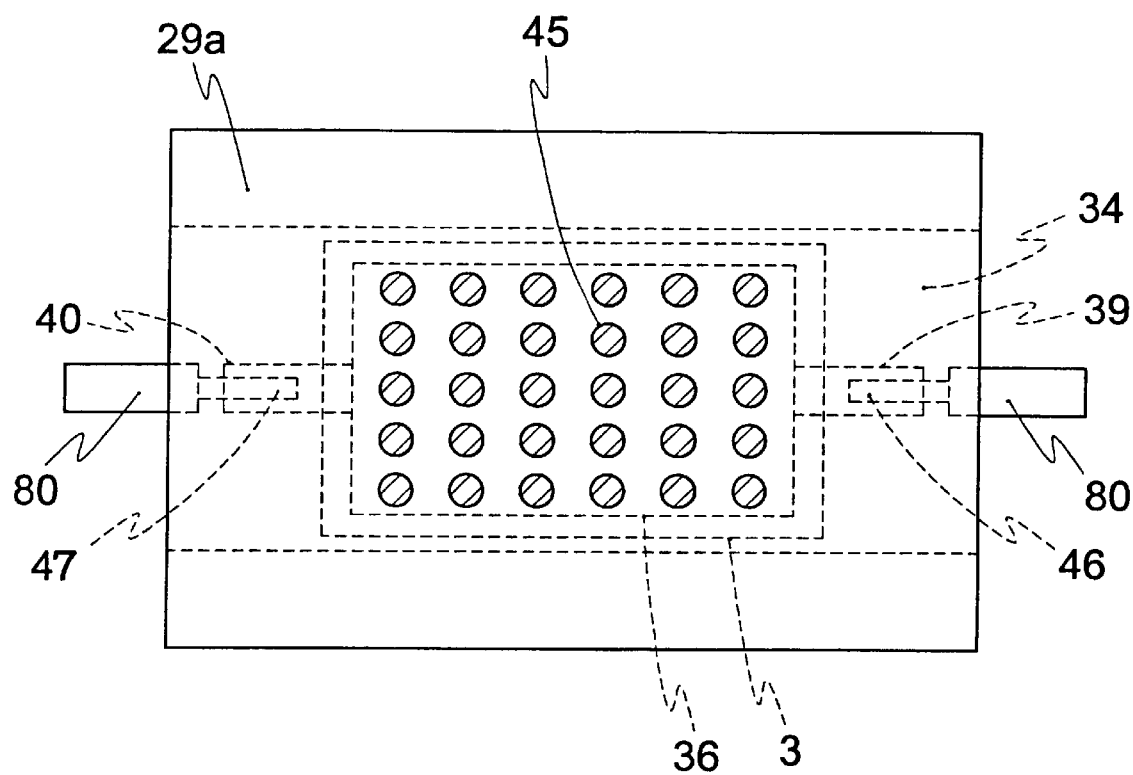
FIG. 34 is a plane view showing an another construction of the ozone generator in Embodiment 18.

FIGS. 33 and 34 are a plane view showing a construction of the jointed electrochemical device in Embodiment 18 of the present invention. In the figure, numeral 80 indicates an insulating resin such as a vinyl resin having durability in water.

According to the Embodiments 14 to 17, the jointed electrochemical device 10 is completely insulated and sealed by an insulating resin such as an epoxy resin. If the device is connected to a direct current power source by using the leads 46 and 48 covered with the insulating resin 80 having durability in water, the device can be used in water.

Embodiment 19

Embodiments 12 to 18 show a case where the fist and second pressing plates 29a and 29b have the opening part of the same area size, but in this embodiment, an area of the opening part of the cathode side is larger than that of the anode side. An opening ratio of the opening part at the cathode side may be selected from 5 to 90% as shown in Embodiment 1. An opening ratio of the opening part at the anode side may be smaller than 5%.

Similarly to Embodiment 5, peeling of the jointed electrochemical device is prevented even if the device is used in a high humidity condition and the gas and heat generated by the electrochemical reaction can be effectively released to outside air to obtain an electrochemical device having steady performance for a long period of time and excellent gas generation performance.

Embodiment 20

Figure 35:
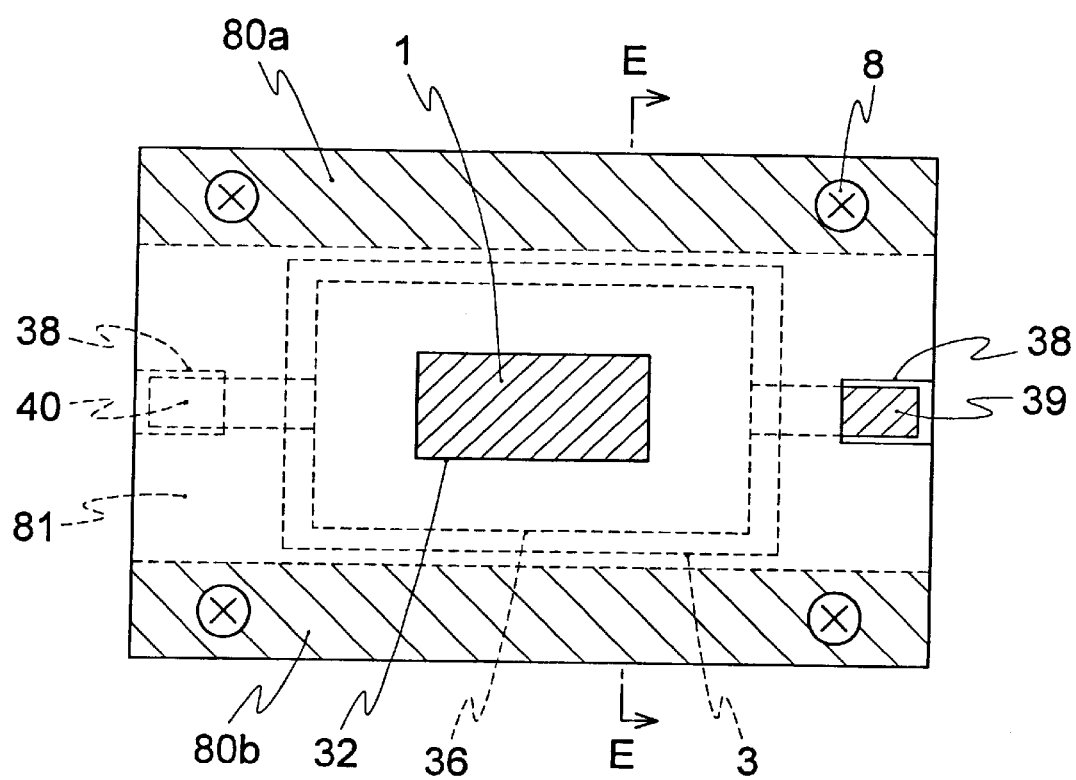
FIG. 35 is a plane view showing a construction of the electrochemical device using the solid polymer electrolytic film in Embodiment 20.
Figure 36:
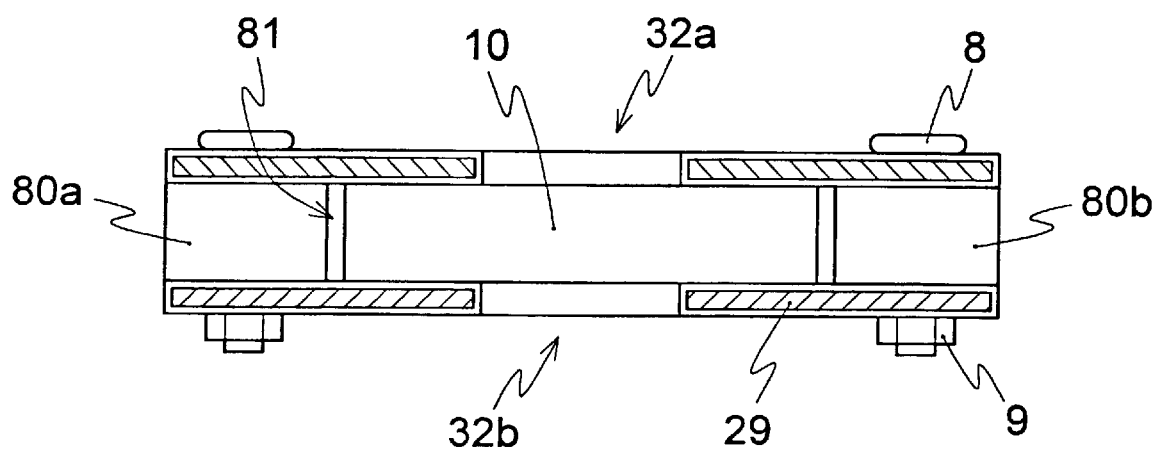
FIG. 36 is a cross sectional view taken on line E—E in FIG. 35.

In the above Embodiments 12 to 19, at least one of the paired pressing plates 29 had a concave part 34. Instead of the concave part 34, a spacer is inserted between the pressing plates 29 to press the jointed electrochemical device in this embodiment as shown in FIG. 36. FIG. 35 is a plane view showing a construction of the electrochemical device using the solid polymer electrolytic film according to Embodiment 20 of the present invention. FIG. 36 is a cross sectional view taken on line E—E in FIG. 35. In the figures, numeral 80a and 80b are spacers which is thinner than the jointed electrochemical device 10 having the same hole diameter as that of the pressing plates 29 for bolt 8. Numeral 81 indicates space formed by the spacers 80a and 80b, in which the electrochemical device is placed.

In this embodiment, the spacers 80a and 80b were positioned at the both ends of the pressing plate 29 and the jointed electrochemical device 10 was placed in the space 81 formed by spacers 80a and 80b. After that, the other pressing plate 29 was layered to press the paired pressing plates 29 by using the bolt 8 and the nut 9 as shown in FIGS. 35 and 36. Specifically, the spacers 80a and 80b were thinner than the jointed electrochemical device 10 by a few ten $\mu$m to a few hundred $\mu$m, and the paired pressing plates 29 were pressed with the bolt 8 and the nut 9 by using a torque driver at a pressing pressure of a few kgf to a few ten kgf. Thus, when the pressing plates 29 are pressed with the spacers 80a and 80b thinner than the jointed electrochemical device 10 at the both edges thereof, the jointed electrochemical device 10 is compressed and the pressing plates 29 are contacted thereto. Therefore, the jointed electrochemical device 10 is uniformly and strongly pressed by the pressing plates 29 as in Embodiment 12.

Embodiment 21

Figure 37:
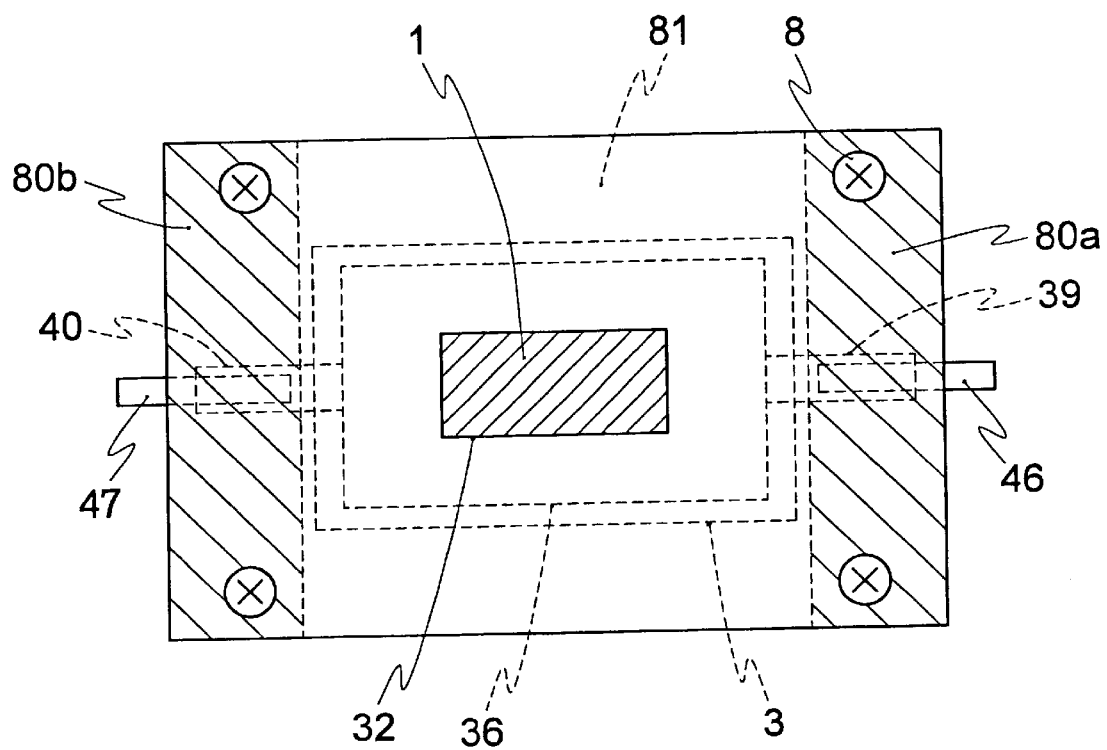
FIG. 37 is a plane view showing a construction of the electrochemical device of Embodiment 21.

FIG. 37 is a plane view showing a construction of the electrochemical device of Embodiment 21. It illustrates an arrangement of spacers 80a and 80b in case of using electrode terminals 39 and 40 and leads 46 and 47. In this embodiment, the jointed electrochemical device 10 and the spacers 80a and 80b at the both edges of the pressing plate 29 were positioned so that the electrode terminal 39 was placed on the spacer 80a and the electrode terminal 40 was placed under the spacer 80b as shown in FIG. 37. The other pressing plate 29 was layered to press the paired pressing plates 29 by using the bolt 8 and the nut 9. Thus, once the spacers 80a and 80b are placed, the jointed electrochemical device 10 can be pressed uniformly and strongly with the pressing plates 29 and can be steadily connected with the electrode terminals 39 and 40 and the leads 46 and 47.

Embodiment 22

Figure 38:
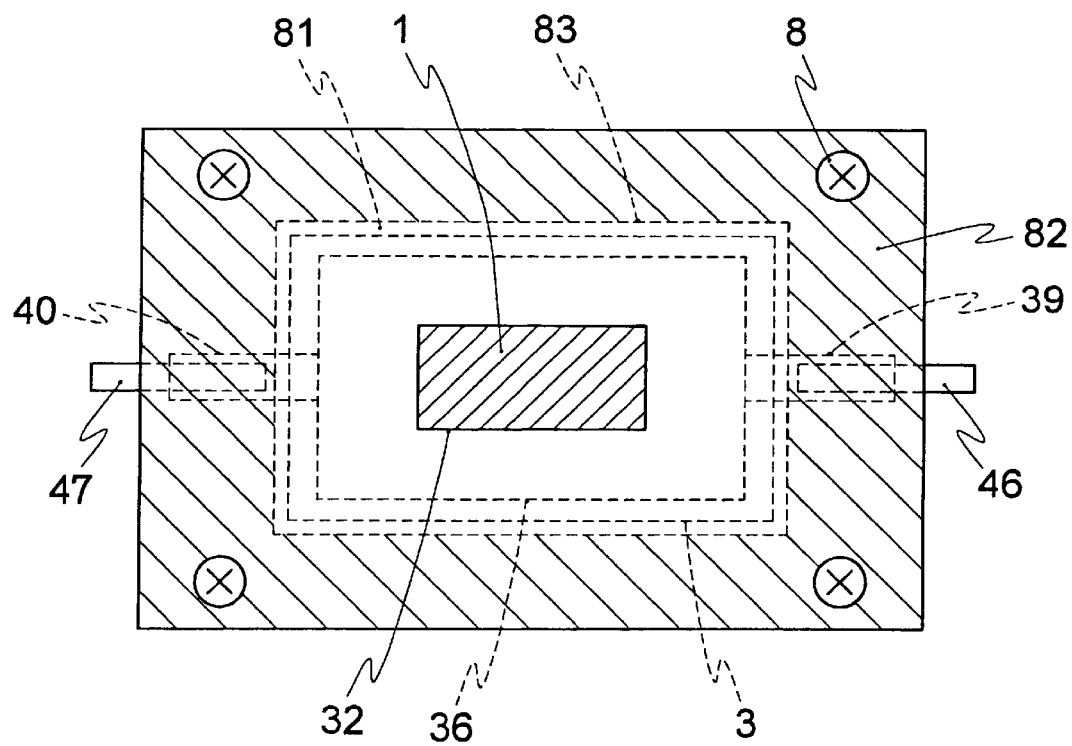
FIG. 38 is a plane view showing a construction of the electrochemical device of Embodiment 22.

FIG. 38 is a plane view showing a construction of the electrochemical device of Embodiment 22. In the figure, numeral 82 indicates a spacer having an opening part 83. The opening part 83 of the spacer 82 has a slightly larger area than the jointed electrochemical device 10 (excluding the projecting electrode part) in order to place the jointed electrochemical device 10 therein. In this embodiment, the spacer 82 was layered on the pressing plate 29, the jointed electrochemical device 10 was placed in the opening part 83 of the spacer 82. After that, the other pressing plate 29 was layered to press it by using bolt 8 and nut 9. Thus, by placing the spacer 82, the jointed electrochemical device 10 can be pressed uniformly and strongly with the pressing plates 29 and can be steadily connected with the electrode terminals 39 and 40 and the leads 46 and 47.

The above Embodiments 20 to 22 illustrated a case where the pressing plates 29 have one rectangular or circular opening part 32 at their center part, but the same effect can be obtained even if the opening part comprises a plurality of through holes 45.

Also, the above Embodiments 20 to 22 illustrated a case of pressing the jointed electrochemical device 10 by fixing the paired pressing plates 29 with the bolt 8 and the nut 9. However, the same effect can be obtained even if the insulating adhesive agent 33 or a sheet-like insulating resin agent is used to press the paired pressing plates 29. In this case, the insulating adhesive agent 33 or the sheet-like insulating resin agent is applied all over the pressing plates 29 except for the opening part 32 or the electrochemical reaction part 36.

As the pressing plate, there can be used a metal plate covered with insulating resin film, an insulating resin plate, a ceramic plate and the like.

Embodiment 23

The electrochemical device 50 having a pressing construction of the present invention is thin, light and small and can be operated by a little direct current voltage. Therefore, there may be no limitation for setting position and can be easily placed in a narrow space.

Figure 39:
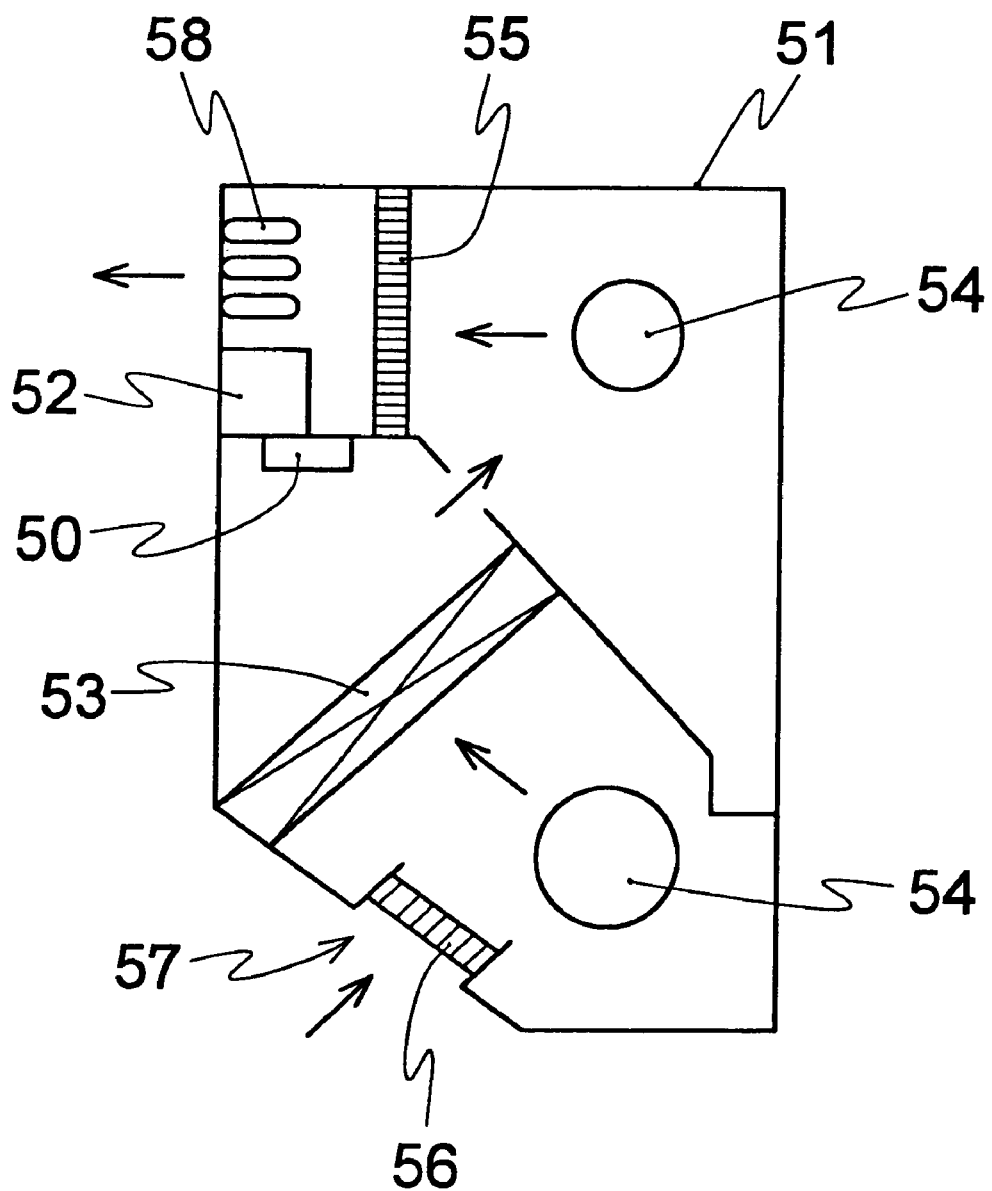
FIG. 39 shows a cross sectional view of an air conditioner having the jointed electrochemical device 8, which is an ozone generator.

FIG. 39 shows a cross sectional view of an air conditioner having the jointed electrochemical device 8, which is an ozone generator. In FIG. 39, numeral 50 indicates the electrochemical device having a pressing construction of the present invention, numeral 51 the air conditioner, numeral 52 a power source of the air conditioner 51 having direct current, numeral 53 a heat exchanger, numeral 54 a fan, numeral 55 a dust collecting filter, numeral 56 a filter having activated carbon for deodorant, numeral 57 an air inhalation port, numeral 58 an air exhalation port. The electrochemical device 50 can easily be placed, for example, at a narrow space where the heat exchanger is positioned. The interior of the air conditioner 51, the heat exchanger 53, surfaces of the fan 54 and the filter 55 will be disinfected by the ozone generated by using the electrochemical device 50, fertility of accreted microorganisms which form odor is prevented, the inside of the air conditioner 51 become cleaned, and odor and dust adhesion are restrained.

The electrochemical device 50 may be operated synchronically with running of the air conditioner 51. The operation may be intermittent with an operation period of a few to ten minutes while the air conditioner 51 is on. Also, the device may be operated for a few hours after stopping running of the air conditioner 51. In addition, though the electrochemical device 50 was placed at a space where the heat exchanger was positioned in this embodiment, the position is not limited thereto and the device can be placed anywhere inside the air conditioner 51.

Embodiment 24

Figure 40:
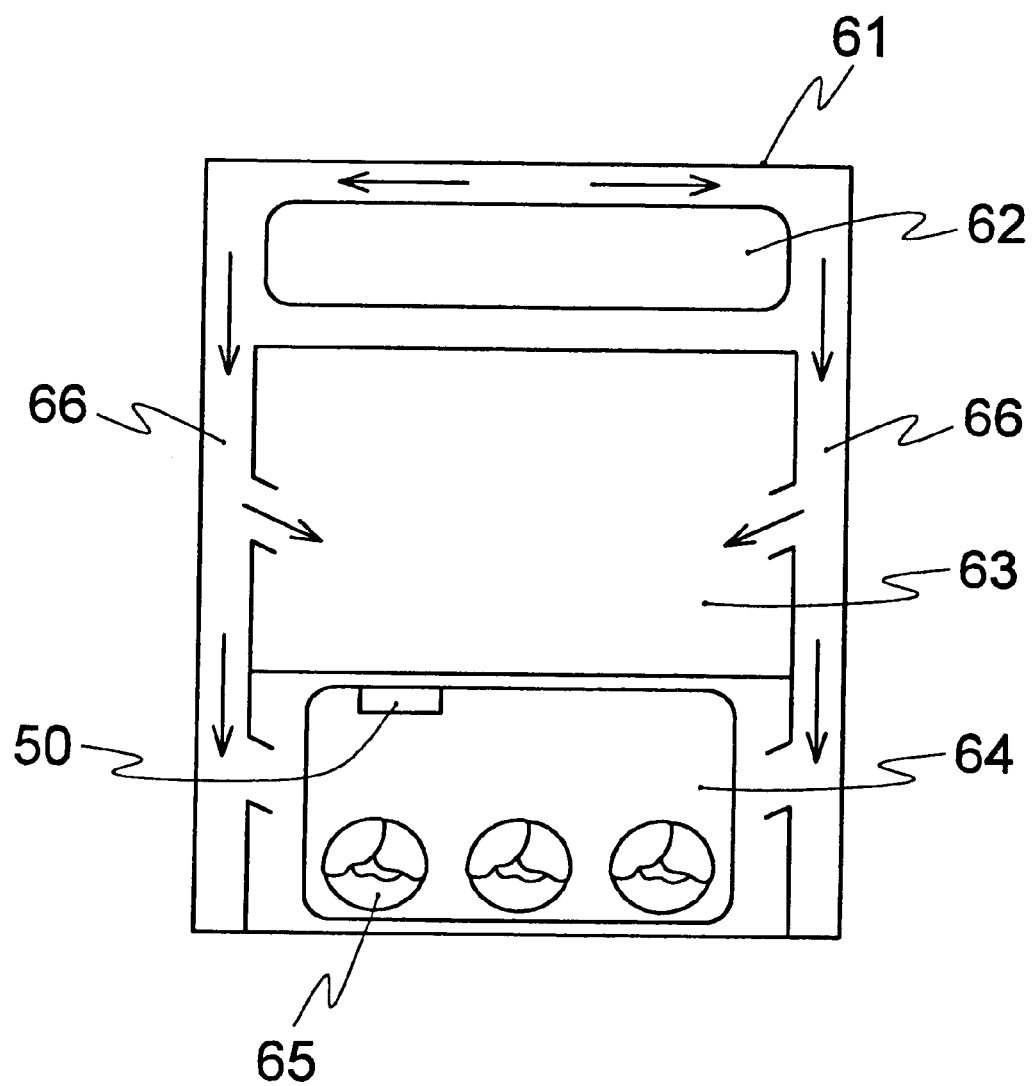
FIG. 40 shows a cross sectional view of a refrigerator having the jointed electrochemical device 8, which is an ozone generator inside a vegetable compartment.

FIG. 40 shows a cross sectional view of a refrigerator having the jointed electrochemical device 8, which is an ozone generator inside a vegetable compartment. In FIG. 40, numeral 61 indicates the refrigerator 61, numeral 62 a freezing room, numeral 63 a refrigerating room, numeral 64 a vegetable compartment, numeral 65 a vegetable, numeral 66 a cold air passage. Humidity is high especially in the vegetable compartment due to evaporation of water from vegetables. However, an ozone generation amount will be maintained steadily even in the above high humidity condition by using the electrochemical device 50 having the pressing construction of the present invention.

It is preferable to operate the electrochemical device 50 intermittently with an operation period of a few to ten minutes in order to achieve an ozone concentration of at most 0.1 ppm in accordance with the volume of the vegetable compartment. And the electrochemical device 50 may be used with a catalyst of ozone decomposition, which is not drawn in the figure.

The electrochemical device 50 having a pressing construction of the present invention is thin, light and small and can be operated by a little direct current voltage. Therefore, there may be no limitation for setting position and the device can be easily placed in a narrow space. Other than the above, the device can be placed in home appliances and apparatuses such as an air cleaner, a Japanese foot warmer (kotatsu) and a vacuum cleaner. Also, it can be placed at the inside of a car. In addition, the device can be placed under a relatively high humidity condition of the inside of a container or an apparatus such as a dish container, a garbage container or a disposer, of an animal breeding room and of a plant culturing room. Accordingly, disinfection effect, mold resistance and deodorization effect are maintained steadily for a long period of time. Properly, the electrochemical device 50 may be used with a catalyst of ozone decomposition also in these cases.

Embodiment 25

Figure 41:
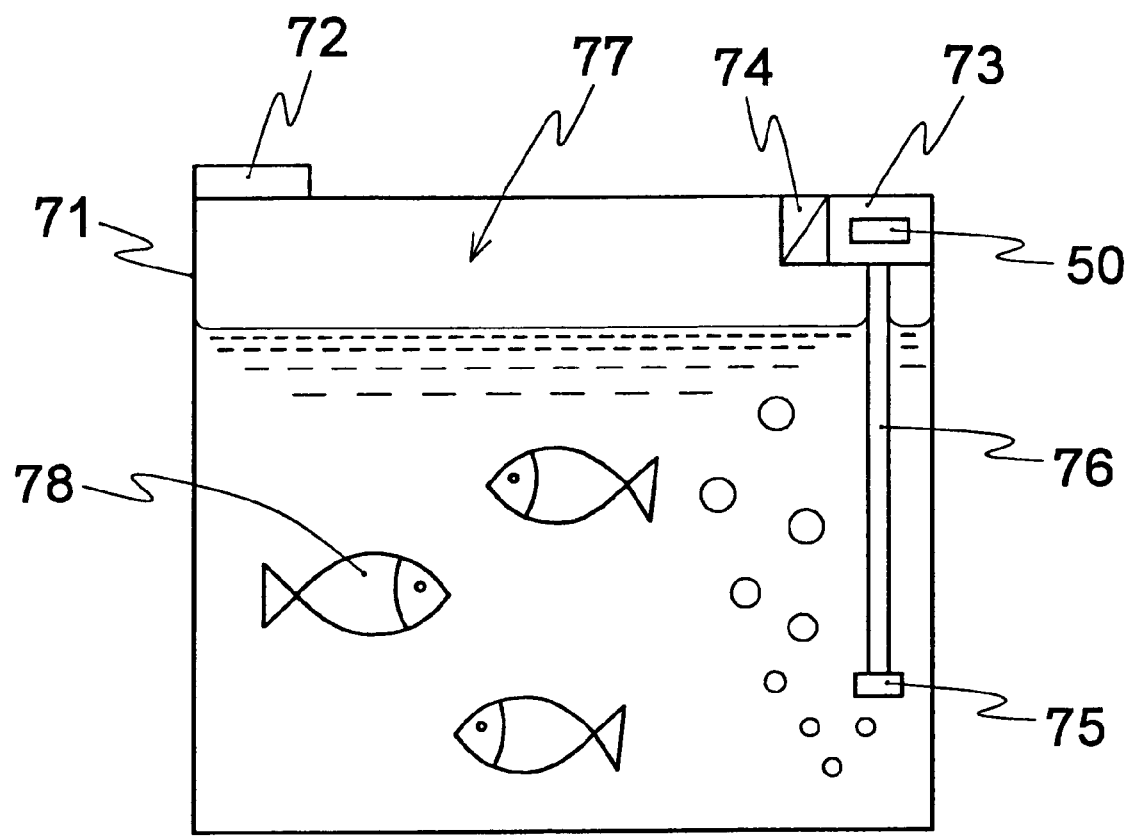
FIG. 41 is an explanatory view showing a case where the electrochemical device is placed at the upper part of a fish breeding tank.
Figure 42:
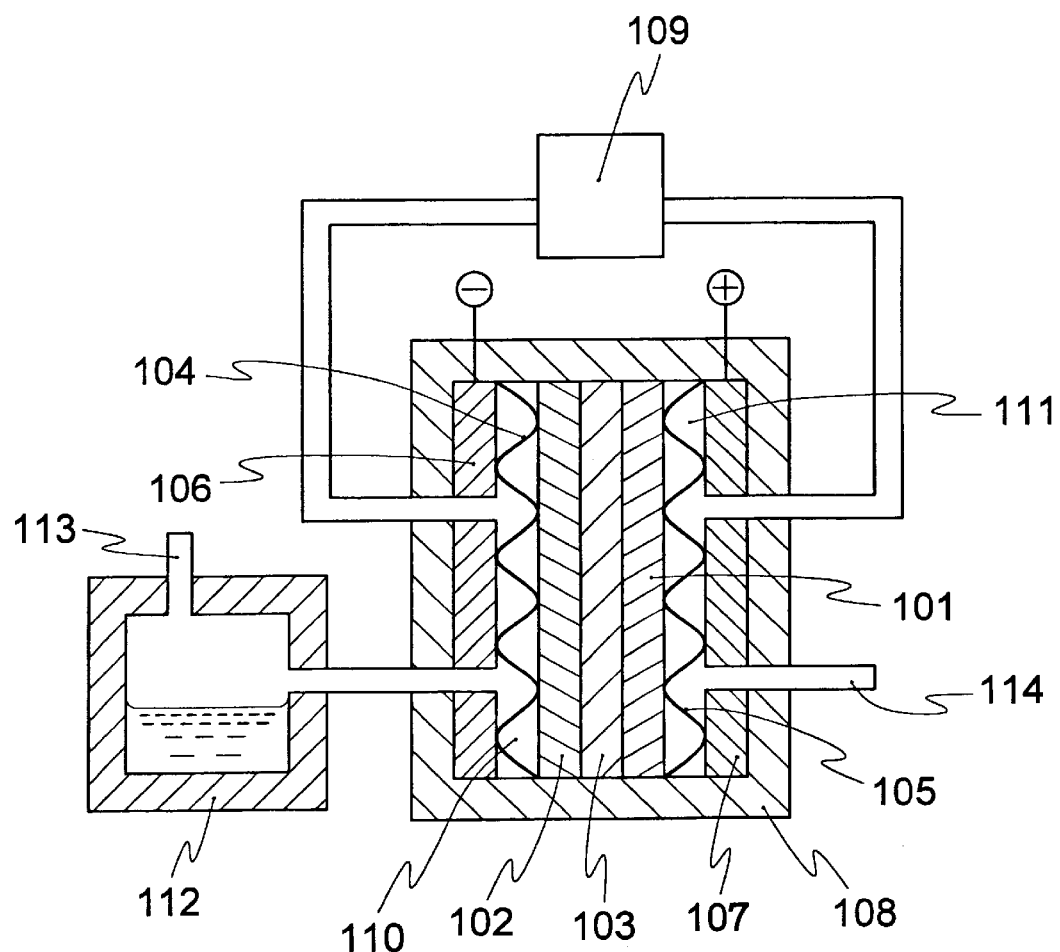
FIG. 42 is a cross sectional view showing a construction of the dehumidification device of Prior art Embodiment 1.
Figure 43:
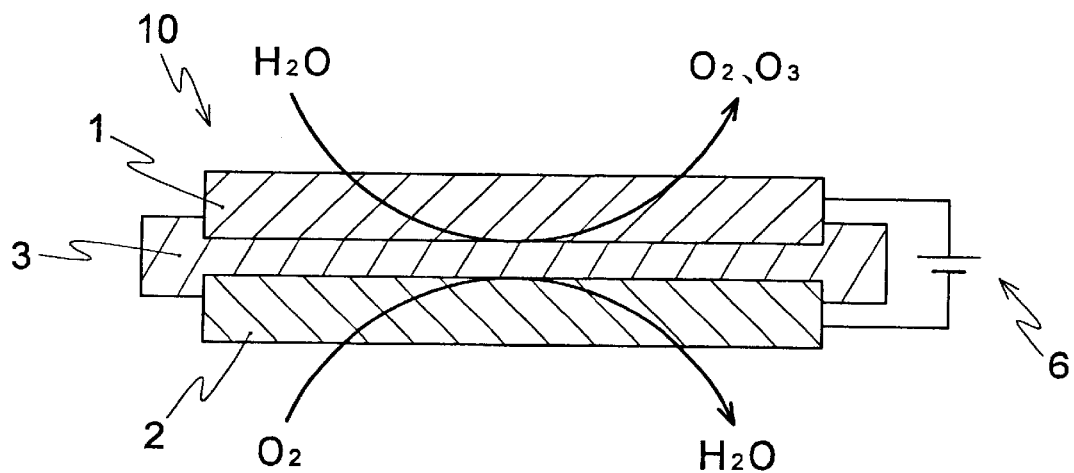
FIG. 43 is a cross sectional view showing a construction of the ozone generator of Prior art Embodiment 2.

FIG. 41 is an explanatory view showing a case where the electrochemical device is placed at the upper part of a fish breeding tank. In FIG. 41, numeral 71 indicates a water tank, numeral 72 a direct current power source, numeral 73 a diffuser, numeral 74 a fan, numeral 75 a diffuser used for aeration of the air having ozone gas and oxygen gas into water, numeral 76 an induction tube, numeral 77 a humid space and numeral 78 fish. As mentioned above, the electrochemical device 50 having a pressing construction of the present invention is thin, light and small and can be operated by a little direct current voltage (a dry battery or a secondary battery). Therefore, there may be no limitation for setting position and the device can be placed in a narrow space easily, for example, at the inside of the compact diffuser 83 as shown in the figure. The air having ozone gas and oxygen gas generated by the electrochemical device 50 is aerated by the diffuser 75 into water and the ozone cleans the water in the tank 71 to obtain an effect that a dissolved oxygen concentration is highly maintained.

Also, even if the device is used as a dehumidifier, an oxygen generator or a hydrogen generator which is not shown in the figure, it is also possible that setting position of the device is not limited, the device is easily placed in a narrow space, and that gas exchange or gas generation is steadily maintained for a long time, because the electrochemical device 50 of the present invention is thin, light and small and operable by a little direct current.

As mentioned above, according to the first electrochemical device of the present invention, the device is constructed as follows: a jointed electrochemical device, which is obtained by jointing an anode and a cathode having a catalytic layer on a base substrate of conductive porous material to both sides of a solid polymer electrolytic film, is placed between and pressed by a pair of pressing plates having a smaller opening part than an area of a electrochemical reaction part formed by facing the anode and cathode. As a result, there are effects that performance of the electrochemical device can be steadily maintained for a long time even at a high humidity condition and that a thin and light electrochemical device can be obtained.

According to the second electrochemical device of the present invention, an area of the opening part is 5 to 90% to that of the electrochemical reaction part in the first device. As a result, there are effects that performance of the electrochemical device can be steadily maintained for a long time even at a high humidity condition and that a thin and light electrochemical device can be obtained.

According to the third electrochemical device of the present invention, the opening part is a plurality of through holes formed on the pressing plate in the first device. As a result, there are effects that an electrochemical reaction part can be uniformly pressed and that steady performance is maintained for a longer period of time.

When an area of the cathode opening part is larger than that of the anode opening part in the first device, there are effects that peeling of the electrochemical device is prevented even if it is used in a high humidity condition, the gas and heat generated by the electrochemical reaction can be effectively released to outside air, and that steady and excellent performance can be maintained for a long period of time.

According to the fourth electrochemical device of the present invention, the pressing plate comprises a metal plate and an insulating resin sheet present between the metal plate and the anode or the cathode, or an insulating resin film covering the metal plate in the first device. As a result, there is an effect that the pressing can be effected more firmly by using the metal plate. In addition, if the pressing plate comprises a metal plate and an insulating resin film covering the metal plate, there are effects that releasability of the generated heat by an electrochemical reaction is improved, steady performance can be maintained for a long period of time and that an electrochemical device having excellent performance can be obtained. Further, improvement in thermal releasability may lead to reduction of the thickness of the metal plate. Also, a low price metal plate can be used and even the assembly becomes easier.

According to the fifth electrochemical device of the present invention, the pressing plate comprises an insulating resin plate or an insulating ceramics plate in the first device. As a result, there are effects that the number of necessary parts is lowered and that preparation steps are abbreviated. In addition, if the insulating ceramics plate is used, the device becomes light.

According to the sixth electrochemical device of the present invention, the pressing plate is jointed with the device by an insulating adhesive agent except for at least the opening part in the first device. As a result, steady performance of the electrochemical device is maintained for a long period of time even at a high humidity condition and the device becomes light.

According to the seventh electrochemical device of the present invention, the opening part is a plurality of through holes formed on the pressing plate in the sixth device. As a result, all of the electrochemical reaction part can be uniformly pressed and steady performance can be maintained for a longer period of time.

When an area of the cathode opening part is larger than that of the anode opening part in the seventh device, peeling of the electrochemical device is prevented even if it is used in a high humidity condition, the gas and heat generated by the electrochemical reaction can be effectively released to outside air, and steady and performance can be maintained for a long period of time to obtain an excellent gas generation property.

According to the eighth electrochemical device of the present invention, the pressing plate comprises a metal plate and an insulating resin film covering the metal plate in the sixth device, and therefore, the pressing can be effected more firmly by using the metal plate. Also, releasability of the generated heat by an electrochemical reaction is improved, steady performance can be maintained for a long period of time and an electrochemical device having excellent performance can be obtained.

According to the ninth electrochemical device of the present invention, the pressing plate comprises an insulating resin film or an insulating ceramics plate in the sixth device. As a result, there are effects that the number of necessary parts is lowered and that preparation steps are abbreviated. In addition, if the insulating ceramics plate is used, there is an effect that the device becomes light.

According to the tenth electrochemical device of the present invention, at least one of the pressing plates has a concave part to which the above jointed electrochemical device is inserted in the first device. As a result, the electrochemical reaction part of the electrochemical device can be uniformly pressed by using the pressing plates, steady performance of the electrochemical device is maintained for a longer period of time, and a thin and light electrochemical device formed by a solid polymer electrolytic film can be obtained.

According to the eleventh electrochemical device of the present invention, the opening part is a plurality of through holes. on a pressing plate in the tenth device. As a result, the electrochemical reaction part can be uniformly pressed and steady performance of the electrochemical device is maintained for a longer period of time.

When an area of the cathode opening part is larger than that of the anode opening part in the twelfth device, peeling of the electrochemical device is prevented even if the device is used in a high humidity condition, the gas and heat generated by the electrochemical reaction can be effectively released to outside air, and steady performance can be maintained for a long period of time to obtain an excellent gas generation property.

According to the twelfth electrochemical device of the present invention, the pressing plate comprises a metal plate and an insulating resin film covering the metal plate in the tenth device. As a result, the pressing can be effected more firmly by using the metal plate. In addition, releasability of the generated heat by an electrochemical reaction is improved, steady performance can be maintained for a long period of time and an electrochemical device having excellent performance can be obtained. Further, the improvement in thermal releasability may lead to reduction of the thickness of the metal plate. Also, a low price metal plate can be used.

According to the thirteenth electrochemical device of the present invention, the pressing plate comprises an insulating resin film or an insulating ceramics plate in the tenth device. As a result, there are effects that the number of necessary parts is lowered and that preparation steps are abbreviated. In addition, if the insulating resin plate is used, there is an effect that the device becomes light.

According to the fourteenth electrochemical device of the present invention, the pressing plate is jointed with the device by an insulating adhesive agent except for at least the above opening part in the in the tenth device. As a result, the device become light and small compared to conducting fixation of the pressing plates by using a bolt and a nut.

According to the fifteenth electrochemical device of the present invention, which has an opening part to which the jointed electrochemical device is inserted, and wherein spacers thinner than the jointed electrochemical device are placed between a pair of pressing plates. As a result, the jointed electrochemical device is uniformly and strongly pressed by the pressing plates.

According to the sixteenth electrochemical device of the present invention, the pressing plate comprises an insulating resin plate or an insulating ceramics plate. As a result, the jointed electrochemical device can be pressed uniformly and strongly with the pressing plates and can be steadily connected with the electrode terminals 39 and 40 and the leads.

According to the seventeenth electrochemical device of the present invention, the pressing plate is jointed by an insulating adhesive agent except for at least the opening part in the fifteenth device. As a result, the jointed electrochemical device 10 can be pressed uniformly and strongly with the pressing plates 29 and can be steadily connected with the electrode terminals 39 and 40 and the leads 46 and 47.

According to the first air conditioner of the present invention, the conditioner comprises the electrochemical device of the first electrochemical device of the present invention. As a result, the conditioner is light and small and can be operated by a little direct current voltage. Therefore, there may be no limitation for setting position and can be easily placed in a narrow space.

According to the first refrigerator of the present invention, the refrigerator comprises the electrochemical device of the first electrochemical device of the present invention. As a result, the refrigerator is light and small and can be operated by a little direct current voltage. Therefore, there may be no limitation for setting position and can be easily placed in a narrow space. And an ozone generation amount is maintained steadily even in the above high humidity condition.

According to a process for preparing the first electrochemical device of the present invention, the process is as follows:

a jointed electrochemical device is obtained by jointing an anode and a cathode having a catalytic layer on a base substrate of conductive porous material to both sides of a solid polymer electrolytic film;

a pair of pressing plates are placed to insert the electrochemical device between the anode and cathode side, the pressing plate having an opening part corresponding to an electrochemical reaction part formed by facing the anode and cathode, wherein the pressing plate is placed on the anode and cathode side of the jointed electrochemical device by using a sheet of the insulating adhesive agent therebetween;

and hot-pressed to joint the pressing plate. As a result, the jointed electrochemical device can be jointed uniformly and easily by the adhesive agent without unevenness of application.

What is claimed is:

1. An electrochemical device comprising:

a jointed electrochemical device placed and pressed between a pair of pressing plates;

wherein the jointed electrochemical device includes an anode and a cathode having a catalytic layer jointed on a base substrate of conductive porous material to both sides of a solid polymer electrolytic film, and wherein the pressing plates include an opening part having an area of 10 to 60% to that of an electrochemical reaction part formed by the anode and the cathode where the anode and the cathode face each other.

2. The electrochemical device of claim 1, wherein the opening part is a plurality of through holes formed on the pressing plate.

3. The electrochemical device of claim 1, wherein the pressing plate comprises a metal plate and an insulating resin sheet present between the metal plate and an anode or a cathode, or an insulating resin film covering the metal plate.

4. The electrochemical device of claim 1, wherein the pressing plate comprises an insulating resin plate or an insulating ceramics plate.

5. The electrochemical device of claim 1, wherein the pressing plate is jointed by an insulating adhesive agent except for at least the opening part.

6. The electrochemical device of claim 5, wherein the opening part is a plurality of through holes formed on the pressing plate.

7. The electrochemical device of claim 5, wherein the pressing plate comprises a metal plate and an insulating resin film covering the metal plate.

8. The electrochemical device of claim 5, wherein the pressing plate comprises an insulating resin film or an insulating ceramics plate.

9. The electrochemical device of claim 1, wherein at least one of the pressing plates has a concave part to which the jointed electrochemical device is inserted.

10. The electrochemical device of claim 9, wherein the opening part is a plurality of through holes on the pressing plate.

11. The electrochemical device of claim 9, wherein the pressing plate comprises a metal plate and an insulating resin film covering the metal plate.

12. The electrochemical device of claim 9, wherein the pressing plate comprises an insulating resin film or an insulating ceramics plate.

13. The electrochemical device of claim 9, wherein the pressing plate is jointed by an insulating adhesive agent except for at least the opening part.

14. The electrochemical device of claim 1, which has an opening part to which the jointed electrochemical device is inserted, and wherein spacers thinner than the jointed electrochemical device are placed between a pair of pressing plates.

15. The electrochemical device of claim 14, wherein the pressing plate comprises an insulating resin plate or an insulating ceramics plate.

16. The electrochemical device of claim 14, wherein the pressing plate is jointed by an insulating adhesive agent except for at least the opening part.

* * * * *